US012764719B2

(12) United States Patent
Åström et al.

(10) Patent No.: US 12,764,719 B2
(45) Date of Patent: Oct. 13, 2026

(54) DETERMINATION OF TIME AND/OR FREQUENCY DOMAIN CONFIGURATION FOR SIMULTANEOUS OPERATION IN INTEGRATED ACCESS AND BACKHAUL

(71) Applicant: Telefonaktiebolaget LM Ericsson (publ), Stockholm (SE)

(72) Inventors: Magnus Åström, Lund (SE); Boris Dortschy, Vendelsö (SE); Lei Bao, Gothenburg (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 206 days.

(21) Appl. No.: 18/291,427

(22) PCT Filed: Jul. 26, 2022

(86) PCT No.: PCT/EP2022/070960
§ 371 (c)(1),
(2) Date: Jan. 23, 2024

(87) PCT Pub. No.: WO2023/006756
PCT Pub. Date: Feb. 2, 2023

(65) Prior Publication Data

US 2025/0106823 A1 Mar. 27, 2025

Related U.S. Application Data

(60) Provisional application No. 63/225,747, filed on Jul. 26, 2021.

(51) Int. Cl.
*H04W 72/04* (2023.01)

(52) U.S. Cl.
CPC .................................. *H04W 72/04* (2013.01)

(58) Field of Classification Search
CPC . H04W 72/04; H04W 72/23; H04W 72/0446; H04W 72/0453; H04W 84/047; H04W 88/04; H04W 88/085
(Continued)

(56) References Cited

U.S. PATENT DOCUMENTS 11,082,979 B2 * 8/2021 Seo .................. H04W 72/0453
11,303,349 B2 4/2022 Jo et al.
(Continued)

FOREIGN PATENT DOCUMENTS

CN 110692272 A 1/2020
CN 110278610 B * 7/2022 ............... H04L 5/14
(Continued)

OTHER PUBLICATIONS

Office Action dated Feb. 27, 2025 for U.S. Appl. No. 17/917,521, filed Oct. 6, 2022, consisting of 25 pages.
(Continued)

*Primary Examiner* — Mahendra R Patel
(74) *Attorney, Agent, or Firm* — Weisberg I.P. Law, P.A.

(57) ABSTRACT

A network node is described. The network node includes a radio interface configured to receive a first resource configuration associated with a first multiplexing capability and a second resource configuration associated with a second multiplexing capability; and receive signaling activating one of a first multiplexing mode and a second multiplexing mode. The network node further includes processing circuitry in communication with the radio interface, where the processing circuitry configured to determine whether to use the activated one of the first multiplexing mode and the second multiplexing mode based at least on one of the first multiplexing mode, the second multiplexing mode, the first resource configuration, the second resource configuration, and a fallback condition; and use one of the first resource
(Continued)

configuration and the second resource configuration based on the determination.

27 Claims, 20 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 12,267,813 | B2 | 4/2025 | Zhang et al. | |
| 2019/0349079 | A1 | 11/2019 | Novlan et al. | |
| 2020/0084819 | A1 | 3/2020 | Abedini et al. | |
| 2020/0145997 | A1 | 5/2020 | Luo et al. | |
| 2020/0336890 | A1 | 10/2020 | Abedini et al. | |
| 2021/0100012 | A1* | 4/2021 | Miao | H04W 72/23 |
| 2021/0168852 | A1* | 6/2021 | Panteleev | H04L 5/0055 |
| 2021/0243782 | A1* | 8/2021 | Miao | H04L 5/0091 |
| 2021/0289421 | A1* | 9/2021 | Akl | H04W 28/0263 |
| 2021/0368360 | A1 | 11/2021 | Aki et al. | |
| 2021/0368481 | A1* | 11/2021 | Jo | H04W 72/21 |
| 2022/0217661 | A1* | 7/2022 | Yokomakura | H04B 7/155 |
| 2022/0287123 | A1 | 9/2022 | Tiirola et al. | |
| 2022/0361174 | A1 | 11/2022 | Liu | |
| 2023/0108413 | A1 | 4/2023 | You et al. | |
| 2023/0117298 | A1* | 4/2023 | Park | H04L 5/14 370/281 |
| 2023/0164747 | A1* | 5/2023 | You | H04W 72/04 370/329 |
| 2023/0164793 | A1* | 5/2023 | Ghanbarinejad | H04L 5/0053 370/329 |
| 2023/0345553 | A1 | 10/2023 | Maya et al. | |
| 2023/0412250 | A1 | 12/2023 | Huang et al. | |

FOREIGN PATENT DOCUMENTS

| | | | | | |
|---|---|---|---|---|---|
| EP | 4096326 | A1 | | 11/2022 | |
| EP | 4117387 | A1 | * | 1/2023 | H04W 72/23 |
| KR | 20200050280 | A | | 5/2020 | |
| WO | WO-2017014572 | A1 | * | 1/2017 | H04L 5/0051 |
| WO | WO-2018143702 | A1 | * | 8/2018 | H04L 1/18 |
| WO | 2020010613 | A1 | | 1/2020 | |
| WO | 2020032578 | A1 | | 2/2020 | |
| WO | WO-2020145358 | A1 | * | 7/2020 | H04B 7/15542 |
| WO | 2020239042 | A1 | | 12/2020 | |
| WO | 2021028785 | A1 | | 2/2021 | |
| WO | WO-2021178788 | A1 | * | 9/2021 | H04W 72/23 |
| WO | 2021205343 | A1 | | 10/2021 | |
| WO | 2022084301 | A1 | | 4/2022 | |
| WO | 2022214528 | A1 | | 10/2022 | |

OTHER PUBLICATIONS

European Office Action dated Nov. 7, 2025 for Application No. 21718661.8; consisting of 6 pages.
Office Action dated Sep. 26, 2025 for U.S. Appl. No. 18/553,887; consisting of 29 pages.
International Search Report and Written Opinion dated Nov. 16, 2022 for International Application No. PCT/EP2022/070960 filed Jul. 26, 2022; consisting of 19 pages.
3GPP TSG RAN Meeting #88e, RP-201293 (revision of RP-193251); Title: New WID on Enhancements to Integrated Access and Backhaul; Source: Qualcomm; Document for: Approval; Agenda Item: 9.10. 10; Date and Location: Jun. 29-Jul. 3, 2020, Electronic Meeting; consisting 6 pages.
3GPP TSG-RAN WG1 Meeting #104-bis-e, R1-2103712; Title: Resource multiplexing and DC in enhanced IAB; Agenda Item: 8.10.1; Source: Ericsson; Document for: Discussion, Decision; Date and Location: Apr. 12-20, 2021, eMeeting; consisting 15 pages.
3GPP TSG RAN WG1 #104b-e, R1-2102538; Title: Enhancement to resource multiplexing between child and parent links; Source: vivo; Agenda Item: 8.10.1; Document for: Discussion and Decision; Date and Location: Apr. 12-20, 2021, e-Meeting; consisting of 8 pages.
3GPP TS 38.473 V16.6.0; 3rd Generation Partnership Project; Technical Specification Group Radio Access Network; NG-RAN; F1 application protocol (F1AP) (Release 16); Jul. 2021; consisting of 466 pages.
3GPP TR 38.874 V16.0.0; 3rd Generation Partnership Project; Technical Specification Group Radio Access Network; NR; Study on Integrated Access and Backhaul; (Release 16); Dec. 2018; consisting of 111 pages.
International Search Report and Written Opinion dated Feb. 8, 2022 for International Application No. PCT/EP2021/078923 filed Oct. 19, 2021; consisting of 13 pages.
3GPP TSG-RAN WG1 Meeting #99 R1-1912133; Title: Remaining issues on IAB resource configuration and multiplexing; Agenda Item: 7.2.3.1; Source: Ericsson; Document for: Discussion; Date and Location: Nov. 18-22, 2019, Reno, US; consisting of 5 pages.
3GPP TSG RAN WG1 Meeting #102-e R1-2006329; Title: Discussions on enhancements to resource multiplexing between child and parent links of an IAB node; Agenda Item: 8.10.1; Source: CEWiT; Document for: Discussions; Date and Location: Aug. 17-28, 2020, e-Meeting; consisting of 7 pages.
3GPP TSG RAN WG1 Meeting #102-e R1-2006361; Title: Discussion on IAB resource multiplexing enhancements; Agenda Item: 8.10.1; Source: ETRI; Document for: Discussion/Decision; Date and Location: Aug. 17-28, 2020, e-Meeting; consisting of 8 pages.
3GPP TSG-RAN WG3 Meeting #107-e R3-201144; Title: CB # 45_Email045-IAB_PHYlayer_param_F1AP; Agenda Item: 13.2.1. 4; Source: Qualcomm Incorporated; Document for: Agreement; Date and Location: Feb. 24-Mar. 6, 2020, Electronic Meeting; consisting of 6 pages.
3GPP TS 38.473 V15.4.0; 3rd Generation Partnership Project; Technical Specification Group Radio Access Network; NG-RAN; F1 application protocol (F1AP) (Release 15); Dec. 2018; consisting of 192 pages.
3GPP TS 38.425 V15.6.0; 5G; 3rd Generation Partnership Project; Technical Specification Group Radio Access Network; NG-RAN; NR user plane protocol (Release 15); Jul. 2019; consisting of 22 pages.
3GPP TS 23.501 V15.5.0; 3rd Generation Partnership Project; Technical Specification Group Services and System Aspects; System Architecture for the 5G System; Stage 2 (Release 15); Mar. 2019; consisting of 241 pages.
3GPP TS 29.281 V15.6.0; 3rd Generation Partnership Project; Technical Specification Group Core Network and Terminals; General Packet Radio System (GPRS) Tunnelling Protocol User Plane (GTPv1-U) (Release 15); Sep. 2019; consisting of 32 pages.
3GPP TS 33.401 V15.8.0; 3rd Generation Partnership Project; Technical Specification Group Services and System Aspects; 3GPP System Architecture Evolution (SAE); Security architecture (Release 15); Jun. 2019; consisting of 163 pages.
3GPP TS 38.213 V16.5.0; 3rd Generation Partnership Project; Technical Specification Group Radio Access Network NR; Physical layer procedures for control (Release 16); Mar. 2021, consisting of 183 pages.
3GPP TS 38.321 V15.2.0; 3rd Generation Partnership Project; Technical Specification Group Radio Access Network; NR; Medium Access Control (MAC) protocol specification (Release 15), Jun. 2018; consisting of 73 pages.
3GPP TS 38.331 V16.4.0; 3rd Generation Partnership Project; Technical Specification Group Radio Access Network; NR; Radio Resource Control (RRC) protocol specification (Release 16); Mar. 2021; consisting of 949 pages.
3GPP TS 38.401 V15.6.0; 3rd Generation Partnership Project; Technical Specification Group Radio Access Network; NG-RAN; Architecture description (Release 15); Jul. 2019; consisting of 46 pages.

(56) References Cited

OTHER PUBLICATIONS

3GPP TS 38.463 V15.4.0; 3rd Generation Partnership Project; Technical Specification Group Radio Access Network; NG-RAN; E1 Application Protocol (E1AP) (Release 15); Jul. 2019; consisting of 177 pages.
3GPP TS 38.473 V15.6.0; 3rd Generation Partnership Project; Technical Specification Group Radio Access Network; NG-RAN; F1 application protocol (F1AP) (Release 15); Jul. 2019; consisting of 220 pages.
3GPP TR 38.801 V14.0.0; 3rd Generation Partnership Project; Technical Specification Group Radio Access Network; Study on new radio access technology: Radio access architecture and interfaces (Release 14); Mar. 2017; consisting of 91 pages.
3GPP TR 38.806 V15.0.0; 3rd Generation Partnership Project; Technical Specification Group Radio Access Network; Study of separation of NR Control Plane (CP) and User Plane (UP) for split option 2; (Release 15); Dec. 2017; consisting of 22 pages.
3GPP TSG-RAN WG1 Meeng #105-e R1-2105852; Title: Resource mulplexing and DC in enhanced IAB; Agenda Item: 8.10.1; Source: Ericsson; Document for: Discussion, Decision; Location and Date: Online, May 10-May 27, 2021; consisting of 18 pages.
3GPP TSG-RAN WG1 Meeting #106-e R1-2108107; Title: Resource multiplexing and dual connectivity in enhanced IAB; Agenda Item: 8.10.1; Source: Ericsson; Document for: Discussion, Decision; Location and Date: Online, Aug. 16-27, 2021; consisting of 21 pages.
3GPP TSG-RAN WG1 Meeting #106bis-e R1-2110331; Title: Resource multiplexing and dual connectivity in enhanced IAB; Agenda Item: 8.10.1; Source: Ericsson; Document for: Discussion, Decision; Location and Date: Online, Oct. 11-19, 2021; consisting of 20 pages.
3GPP TR 38.874 V0.2.1; 3rd Generation Partnership Project; Technical Specification Group Radio Access Network; Study on Integrated Access and Backhaul; (Release 15); May 2018; consisting of 19 pages.
Office Action dated Aug. 14, 2025 issued in U.S. Appl. No. 18/249,295, filed Apr. 17, 2023, consisting of 42 pages.
3GPP TSG-RAN WG1 Meeting #100-e R1-2001452; Title: Corrections on integrated access and backhaul; Source to WG: Samsung; Work item code: NR_IAB-Core; Date and Location: Feb. 24-Mar. 6, 2020, e-Meeting; consisting of 5 pages.
3GPP TSG RAN Meeting #86 RP-193251 (revision of RP-193145); Title: New WID on Enhancements to Integrated Access and Backhaul; Source: Qualcomm; Document for: Approval: Agenda Item: 9.1.2; Date and Location: Dec. 9-12, 2019, Sitges, Spain; consisting of 5 pages.
3GPP TSG RAN WG1 #96 R1-1901894; Title: Mechanisms for resource coordination and radio-aware scheduling for IAB; Agenda Item: 7.2.3.6; Source: AT&T; Document for: Discussion/Approval; Date and Location: Feb. 25-Mar. 1, 2019, Athens, Greece; consisting of 6 pages.
3GPP TSG RAN WG1 Meeting #98 R1-1908987; Title: Mechanisms for resource multiplexing among backhaul and access links; Agenda item: 7.2.3.3; Source: Nokia, Nokia Shanghai Bell; Document for: Discussion and Decision; Date and Location: Aug. 26-30, 2019, Prague, Czech Republic; consisting of 20 pages.
3GPP TSG RAN WG1 Meeting #96 R1-1902992; Title: IAB Resource Management Framework; Agenda Item: 7.2.3.2; Source: Qualcomm Incorporated; Document for: Discussion and decision; Date and Location: Feb. 25-Mar. 1, 2019; consisting of 8 pages.
3GPP TSG-RAN WG1 Meeting #100-e R1-2001160; Title: Summary #2 of 7.2.3.3—Mechanisms for resource multiplexing among backhaul and access links; Agenda Item: 7.2.3.3; Source: AT&T; Document for: Discussion/Approval; Date and Location: Feb. 24-Mar. 6, 2020, e-Meeting; consisting of 19 pages.
3GPP TS 38.473 V16.4.0; 3rd Generation Partnership Project; Technical Specification Group Radio Access Network; NG-RAN; F1 application protocol (F1AP) (Release 16); Jan. 2021; consisting of 461 pages.
3GPP TSG-RAN WG1 Meeting #104-e R1-2101695; Title: Resource multiplexing and DC in enhanced IAB; Agenda Item: 8.10.1; Source: Ericsson; Document for: Discussion, Decision; Date and Location: Jan. 25-Feb. 5, 2021, e-Meeting; consisting of 14 pages.
European Office Action dated Oct. 18, 2023 for European Application No. EP21718661.8; consisting of 6 pages.
International Search Report and Written Opinion dated Jun. 16, 2021 for International Application No. PCT/IB2021/052852 filed Apr. 6, 2021; consisting of 10 pages.
Office Action dated Jan. 27, 2026 for U.S. Appl. No. 17/917,521, filed Oct. 6, 2022; consisting of 22 pages.
Chinese Office Action and machine English translation of the Chinese Office Action dated Jul. 22, 2024 issued in Chinese Application No. 202180085789.3, consisting of 20 pages.
3GPP TSG RAN WG1 #99 R1-1912838; Source: AT&T; Title: Mechanisms for supporting access and backhaul link multiplexing; Document for: Discussion/Approval; Agenda Item: 7.2.3.1; Reno, NV, Nov. 18-22, 2019, consisting of 8 pages.

* cited by examiner

DETERMINATION OF TIME AND/OR FREQUENCY DOMAIN CONFIGURATION FOR SIMULTANEOUS OPERATION IN INTEGRATED ACCESS AND BACKHAUL

CROSS-REFERENCE TO RELATED APPLICATIONS

This application is a Submission Under 35 U.S.C. § 371 for U.S. National Stage Patent Application of International Application No.: PCT/EP2022/070960, filed Jul. 26, 2022 entitled "DETERMINATION OF TIME AND/OR FREQUENCY DOMAIN CONFIGURATION FOR SIMULTANEOUS OPERATION IN INTEGRATED ACCESS AND BACKHAUL," which claims priority to U.S. Provisional Application No. 63/225,747, filed Jul. 26, 2021, entitled "DETERMINATION OF TIME OR FREQUENCY DOMAIN H/S/NA FOR SIMULTANEOUS OPERATION IN IAB," the entireties of both of which are incorporated herein by reference.

TECHNICAL FIELD

The present disclosure relates to wireless communications, and in particular, to determination of time- and/or frequency-domain hard/soft/not-available (H/S/NA) for simultaneous operation in integrated access and backhaul (IAB).

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) as well as Sixth Generation (6G) wireless communication systems. Such systems provide, among other features, broadband communication between network nodes, such as base stations, and mobile wireless devices (WD), as well as communication between network nodes (e.g., via communication networks such as Integrated Access and Backhaul (IAB) networks) and between WDs.

Integrated Access and Backhaul Overview

Densification via the deployment of increasing base stations (be them macro or micro base stations) is one of the mechanisms that can be employed to satisfy the ever-increasing demand for more and more bandwidth/capacity in mobile networks. Due to availability of spectrum in the millimeter wave (mmW) band, deploying small cells that operate in this band is an attractive deployment option for these purposes. However, deploying fiber to small cells, which is the usual way in which small cells are deployed, may become very expensive and impractical. Thus, employing a wireless link for connecting the small cells to a communication network (e.g., an operator's network) is a cheaper and practical alternative with more flexibility and shorter time-to-market. One such solution is the IAB network, where the operator can utilize part of the radio resources for a backhaul link.

In FIG. 1, an example IAB deployment that supports multiple hops is shown. The IAB donor node (i.e., IAB donor) has a wired connection to a core network and the TAB nodes (i.e., TAB node 1 and TAB node 2) are wirelessly connected using NR to the IAB donor, either directly or indirectly via another IAB node. The connection between IAB donor/node and wireless devices (WDs) is called access link, whereas the connection between two IAB nodes or between an IAB donor and an IAB node is called backhaul link. WD may refer to a user equipment (UE).

Furthermore, as shown in the example of FIG. 2, an adjacent upstream node which is closer to the IAB donor node of an IAB node is referred to as a parent node of the IAB node. The adjacent downstream node which is further away from the IAB donor node of an IAB node is referred to as a child node of the IAB node. The backhaul link between the parent node and the IAB node is referred to as parent (backhaul) link, whereas the backhaul link between the IAB node and the child node is referred to as child (backhaul) link.

IAB Architecture

One difference of the IAB architecture compared to 3GPP Release 10 (Rel-10) Long Term Evolution (LTE) relay (besides lower layer differences) is that the IAB architecture adopts a Central-Unit/Distributed-Unit (CU/DU) split of network nodes, such as gNBs in which time-critical functionalities may be realized in DU closer to the radio, whereas the less time-critical functionalities are pooled in the CU with the opportunity for centralization. Based on this architecture, an IAB-donor may comprise both CU and DU functions. In particular, the IAB-donner may comprise CU functions of the IAB-nodes under the same IAB-donor. Further, each IAB-node may host the DU function(s) of a gNB. Each IAB-node has a mobile termination (MT), a logical unit providing a necessary set of WD-like functions, e.g., to transmit/receive wireless signals to/from the upstream IAB-node or IAB-donor. Via the DU, the IAB-node establishes radio link control (RLC)-channel to WDs and/or to mobile terminated units (MTs) of the connected IAB-node(s). Via the MT, the IAB-node establishes the backhaul radio interface towards the serving IAB-node or IAB-donor. FIG. 3 shows an example of a reference diagram for a two-hop chain of IAB-nodes under an IAB-donor.

IAB Topologies

Wireless backhaul links may be vulnerable to blockage, e.g., due to moving objects such as vehicles, due to seasonal changes (e.g., foliage), severe weather conditions (e.g., rain, snow or hail), or due to infrastructure changes (e.g., new buildings). Such vulnerability may also apply to IAB-nodes. Also, traffic variations can create uneven load distribution on wireless backhaul links, which may lead to local link and/or node congestion. In view of these concerns, the IAB topology supports redundant paths, which is another difference compared to the Rel-10 LTE relay.

The following example topologies are considered in IAB and are shown in FIG. 4:

Spanning tree (ST); and

Directed acyclic graph (DAG).

In these examples, one IAB node can have multiple child nodes and/or have multiple parent nodes. The multi-connectivity or route redundancy may be used for back-up purposes. It is also possible that redundant routes may be used concurrently, e.g., to achieve load balancing, reliability, etc.

Resource Configuration

Time-Domain Resource Coordination

In cases of in-band operation, the IAB-node is typically subject to the half-duplex constraint, i.e., an IAB-node can only be in either transmission or reception mode at a time. 3GPP Release 16 (Rel-16) IAB mainly considers the time-division multiplexing (TDM) case where the MT and DU resources of the same IAB-node are separated in time. Based on this consideration, the following resource types have been defined for IAB MT and DU, respectively.

From an IAB-node MT point-of-view, as in 3GPP Rel-15, the following example time-domain resources may be indicated for the parent link:

Downlink (DL) time resource;

Uplink (UL) time resource; and

Flexible (F) time resource.

From an IAB-node DU point-of-view, the child link may have the following example types of time resources:

DL time resource;

UL time resource;

F time resource; and

Not-available (NA) time resources (e.g., resources not to be used for communication on the DU child links).

Each of the downlink, uplink and flexible time-resource types of the DU child link can belong to one of two categories:

Hard (H): The corresponding time resource is always available for the DU child link.

Soft (S): The availability of the corresponding time resource for the DU child link is explicitly and/or implicitly controlled by the parent node.

The IAB DU resources may be configured per cell, and the H/S/NA attributes for the DU resource configuration are explicitly indicated per-resource type (D/U/F) in each slot. As a result, the semi-static time-domain resources of the DU part can be of seven types in total: Downlink-Hard (DL-H), Downlink-Soft (DL-S), Uplink-Hard (UL-H), Uplink-Soft (UL-S), Flexible-Hard (F-H), Flexible-Soft (F-S), and Not-Available (NA). The coordination relation between MT and DU resources are listed in Table 1.

TABLE 1

Coordination between MT and DU resources of an IAB-node.

| | | MT configuration | | |
|---|---|---|---|---|
| | | DL | UL | Flexible |
| DU configuration | DL-H | DU: can transmit on DL unconditionally; MT: not available. | DU: can transmit on DL unconditionally; MT: not available. | DU: can transmit on DL unconditionally; MT: not available. |
| | DL-S | DU: can transmit conditionally; MT: available on DL. | DU: can transmit conditionally; MT: available on UL. | DU: can transmit conditionally; MT: available on DL & UL. |
| | UL-H | DU: can schedule UL unconditionally; MT: not available. | DU: can schedule UL unconditionally; MT: not available. | DU: can schedule UL unconditionally; MT: not available. |
| | UL-S | DU: can schedule UL conditionally; MT: available on DL. | DU: can schedule UL conditionally; MT: available on UL. | DU: can schedule UL conditionally; MT: available on DL & UL. |
| | F-H | DU: can transmit on DL or schedule UL unconditionally; MT: not available. | DU: can transmit on DL or schedule UL unconditionally; MT: not available. | DU: can transmit on DL or schedule UL unconditionally; MT: not available. |
| | F-S | DU: can transmit on DL or schedule UL conditionally; MT: available on DL. | DU: can transmit on DL or schedule UL conditionally; MT: available on UL. | DU: can transmit on DL or schedule UL conditionally; MT: available on DL & UL. |
| | NA | DU: not available; MT: available on DL. | DU: not available; MT: available on UL. | DU: not available; MT: available on DL & UL. |

Furthermore, an IAB-DU function may correspond to multiple cells, including cells operating on different carrier frequencies. Similarly, an IAB-MT function may correspond to multiple carrier frequencies. This can either be implemented by one IAB-MT unit operating on multiple carrier frequencies or be implemented by multiple IAB-MT units, each operating on different carrier frequencies. The HIS/NA attributes for the per-cell DU resource configuration may take into account the associated IAB-MT carrier frequency (ies).

One example of such DU configuration is shown in FIG. 5.

Frequency-Domain Resource Configuration

One of the objectives in the Rel-17 IAB work item description (WID) RP-201293 is to have a "specification of enhancements to the resource multiplexing between child and parent links of an IAB node, including: support of simultaneous operation (transmission and/or reception) of IAB-node's child and parent links (i.e., MT Tx/DU Tx, MT Tx/DU Rx, MT Rx/DU Tx, MT Rx/DU Rx)." Tx refers to transmit and/or transmission; Rx refers to receive and/or reception.

One idea for such process is to provide frequency-domain resource configuration. Comparing to the time-domain counterpart, one example of the frequency-domain DU resource configuration is shown in FIG. 6.

Capability Indication

To facilitate the resource configuration, 3GPP has considered that:

The donor CU and the parent node can be made aware of the multiplexing capability between MT and DU (TDM required, TDM not required) of an IAB node to for any {MT CC, DU cell} pair.

3GPP has further detailed the indication of the multiplexing capability as: The indication of the multiplexing capability for the case of no-TDM between IAB MT and IAB DU is additionally provided with respect to each transmission-direction combination (per MT CC/DU cell pair):

MT-TX/DU-TX;

MT-TX/DU-RX;

MT-RX/DU-TX; and

MT-RX/DU-RX.

The corresponding signaling has been defined in 3GPP Technical Specification (TS) 38.473, clause 9.3.1.108 as part of the FT application protocol (F1AP) information element (IE), which is a layer 3 (L3) signaling.

3GPP Rel-17 Objective Regarding Simultaneous Operation

The above refers to the 3GPP Rel-16 IAB specification. In the 3GPP Rel-17 enhanced IAB WID, the following duplexing enhancements are specified:

- Specification of enhancements to the resource multiplexing between child and parent links of an IAB node, including:
  - Support of simultaneous operation (transmission and/or reception) of IAB-node's child and parent links (i.e., MT Tx/DU Tx, MT Tx/DU Rx, MT Rx/DU Tx, MT Rx/DU Rx).

The simultaneous operation includes both frequency-division multiplexing (FDM) and spatial-division multiplexing (SDM).

To facilitate FDM operation, RAN1 considered support of a frequency-domain HIS/NA configuration:

Consideration: For frequency domain multiplexing, HIS/NA configurations for an IAB-node are provided separately in addition to the 3GPP Rel-16 H/S/NA.

SUMMARY

Some embodiments advantageously provide methods, systems, and apparatuses for determination of time- or frequency-domain H/S/NA for simultaneous operation in IAB.

In one embodiment, a network node is configured to receive a first resource configuration for a first multiplexing capability and a second resource configuration for a second multiplexing capability; receive signaling activating one of the first multiplexing capability and the second multiplexing capability; determine whether to use the activated one of the first multiplexing capability and the second multiplexing capability; and use one of the first resource configuration and the second resource configuration based on the determination.

According to one aspect, a network node is described. The network node includes a radio interface configured to receive a first resource configuration associated with a first multiplexing capability and a second resource configuration associated with a second multiplexing capability; and receive signaling activating one of a first multiplexing mode and a second multiplexing mode. The network node further includes processing circuitry in communication with the radio interface, where the processing circuitry configured to determine whether to use the activated one of the first multiplexing mode and the second multiplexing mode based at least on one of the first multiplexing mode, the second multiplexing mode, the first resource configuration, the second resource configuration, and a fallback condition; and use one of the first resource configuration and the second resource configuration based on the determination.

In some embodiments, the radio interface is further configured to transmit, to a donor network node, at least one of the first multiplexing capability and the second multiplexing capability; and transmit, to at least one of a parent network node and a child network node, an ability to exploit the at least one of the first multiplexing capability and the second multiplexing capability.

In some other embodiments, the determination of whether to use the activated one of the first multiplexing mode and the second multiplexing mode includes determining whether one of the first multiplexing mode and the second multiplexing mode is configured for at least one of a time slot and a symbol.

In an embodiment, the determination of whether to use the activated one of the first multiplexing mode and the second multiplexing mode includes determining whether the first resource configuration and the second resource configuration are equivalent.

In another embodiment, the determination of whether to use the activated one of the first multiplexing mode and the second multiplexing mode includes determining whether the fallback condition is fulfilled, where the fallback condition is associated with at least one of a timer expiration, an unsupported multiplexing mode, and operational conditions.

In some embodiments, the activating one of the first multiplexing mode and the second multiplexing mode is signaled one of implicitly and explicitly.

In some other embodiments, the network node is an integrated access and backhaul (IAB) node configured to simultaneously communicate at least with one parent network node and one child network node. The parent network node is a parent IAB node, and the child network node is a child IAB node.

In an embodiment, the first multiplexing capability is one of a time division multiplexing (TDM), a frequency division multiplexing (FDM), and a space-division multiplexing (SDM). The second multiplexing capability is another one of the TDM, the FDM, and the SDM.

In another embodiment, the received first and second resource configurations are based on reported information about the first and second multiplexing capabilities of the network node, respectively.

In some embodiments, each of the first and second resource configurations indicate at least two attribute types. A first attribute type indicates whether resources are associated with at least one of an uplink, a downlink, and a flexible configuration, and a second attribute type indicates whether resources are at least one of hard, soft, and not available.

According to another aspect, a method in a network node is described. The method includes receiving a first resource configuration associated with a first multiplexing capability and a second resource configuration associated with a second multiplexing capability; receiving signaling activating one of a first multiplexing mode and a second multiplexing mode; determining whether to use the activated one of the first multiplexing mode and the second multiplexing mode based at least on one of the first multiplexing mode, the second multiplexing mode, the first resource configuration, the second resource configuration, and a fallback condition; and using one of the first resource configuration and the second resource configuration based on the determination.

In some embodiments, the method further includes: transmitting, to a donor network node, at least one of the first multiplexing capability and the second multiplexing capability; and transmitting, to at least one of a parent network node and a child network node, an ability to exploit the at least one of the first multiplexing capability and the second multiplexing capability.

In some other embodiments, the determination of whether to use the activated one of the first multiplexing mode and the second multiplexing mode includes determining whether one of the first multiplexing mode and the second multiplexing mode is configured for at least one of a time slot and a symbol.

In an embodiment, the determination of whether to use the activated one of the first multiplexing mode and the second multiplexing mode includes determining whether the first resource configuration and the second resource configuration are equivalent.

In another embodiment, the determination of whether to use the activated one of the first multiplexing mode and the second multiplexing mode includes determining whether the fallback condition is fulfilled, where the fallback condition is associated with at least one of a timer expiration, an unsupported multiplexing mode, and operational conditions.

In some embodiments, the activating one of the first multiplexing mode and the second multiplexing mode is signaled one of implicitly and explicitly.

In some other embodiments, the network node is an integrated access and backhaul (IAB) node configured to simultaneously communicate at least with one parent network node and one child network node. The parent network node is a parent IAB node, and the child network node is a child IAB node.

In an embodiment, the first multiplexing capability is one of a time division multiplexing (TDM), a frequency division multiplexing (FDM), and a space-division multiplexing (SDM). The second multiplexing capability is another one of the TDM, the FDM, and the SDM.

In another embodiment, the received first and second resource configurations are based on reported information about the first and second multiplexing capabilities of the network node, respectively.

In some embodiments, each of the first and second resource configurations indicate at least two attribute types. A first attribute type indicates whether resources are associated with at least one of an uplink, a downlink, and a flexible configuration, and a second attribute type indicates whether resources are at least one of hard, soft, and not available.

According to one aspect, a parent network node is described. The parent network node includes a radio interface configured to receive, from a network node, an ability to exploit at least one of a first multiplexing capability and a second multiplexing capability; and transmit, to the network node, signaling activating one of a first multiplexing mode and a second multiplexing mode. The parent network node further includes processing circuitry in communication with the radio interface, where the processing circuitry is configured to determine the activation of one of the first multiplexing mode and the second multiplexing mode based at least in part on the received ability and operational conditions.

In some embodiments, the radio interface is further configured to receive, from a donor network node, at least one of the first multiplexing capability and the second multiplexing capability of the network node.

In some other embodiments, each of first and second resource configurations associated with the first and second multiplexing capabilities, respectively, indicates at least two attribute types. A first attribute type indicates whether resources are associated with at least one of an uplink, a downlink, and a flexible configuration, and a second attribute type indicates whether resources are at least one of hard, soft, and not available.

In an embodiment, the operational conditions include at least one of a timing, a power control, and a cross-link interference.

In some embodiments, the ability is associated with at least one of a time division multiplexing (TDM), a frequency division multiplexing (FDM), and a space-division multiplexing (SDM).

In an embodiment, the ability is associated with at least one of a mobile termination and a distributed unit and at least one of a transmission and a reception of signaling.

In another embodiment, the activating one of the first multiplexing mode and the second multiplexing mode is signaled one of implicitly and explicitly.

In some embodiments, the parent network node is a parent integrated access and backhaul (IAB) node, and the network node is an IAB node configured to simultaneously communicate at least with the parent network node and one child network node, the child network node being a child IAB node.

According to another aspect, a method in a parent network node is described. The method includes receiving, from a network node, an ability to exploit at least one of a first multiplexing capability and a second multiplexing capability; determining an activation of one of a first multiplexing mode and a second multiplexing mode based at least in part on the received ability and operational conditions; and transmitting, to the network node, signaling activating one of the first multiplexing mode and the second multiplexing mode.

In some embodiments, the method further includes receiving, from a donor network node, at least one of the first multiplexing capability and the second multiplexing capability of the network node. The at least one of the first multiplexing capability and the second multiplexing capability is received from the network node.

In some other embodiments, each of first and second resource configurations associated with the first and second multiplexing capabilities, respectively, indicates at least two attribute types. A first attribute type indicates whether resources are associated with at least one of an uplink, a downlink, and a flexible configuration, and a second attribute type indicates whether resources are at least one of hard, soft, and not available.

In an embodiment, the operational conditions include at least one of a timing, a power control, and a cross-link interference.

In some embodiments, the ability is associated with at least one of a time division multiplexing (TDM), a frequency division multiplexing (FDM), and a space-division multiplexing (SDM).

In an embodiment, the ability is associated with at least one of a mobile termination and a distributed unit and at least one of a transmission and a reception of signaling.

In another embodiment, the activating one of the first multiplexing mode and the second multiplexing mode is signaled one of implicitly and explicitly.

In some embodiments, the parent network node is a parent integrated access and backhaul (IAB) node, and the network node is an IAB node configured to simultaneously communicate at least with the parent network node and one child network node, the child network node being a child IAB node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
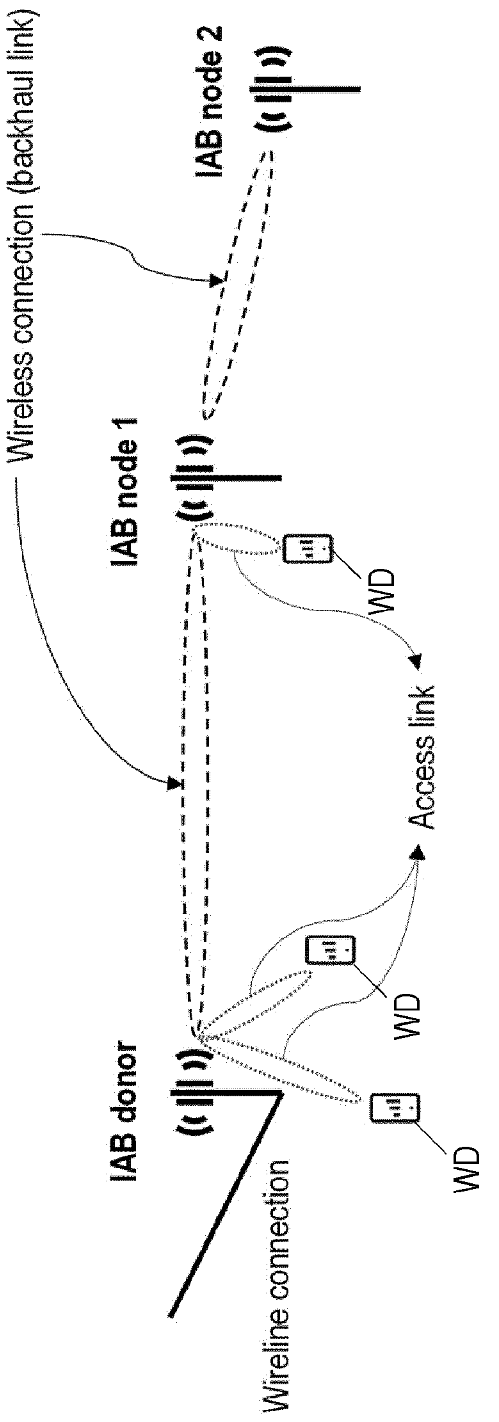
FIG. 1 is an example of a multi-hop deployment in an integrated access and backhaul (IAB) network.
Figure 2:
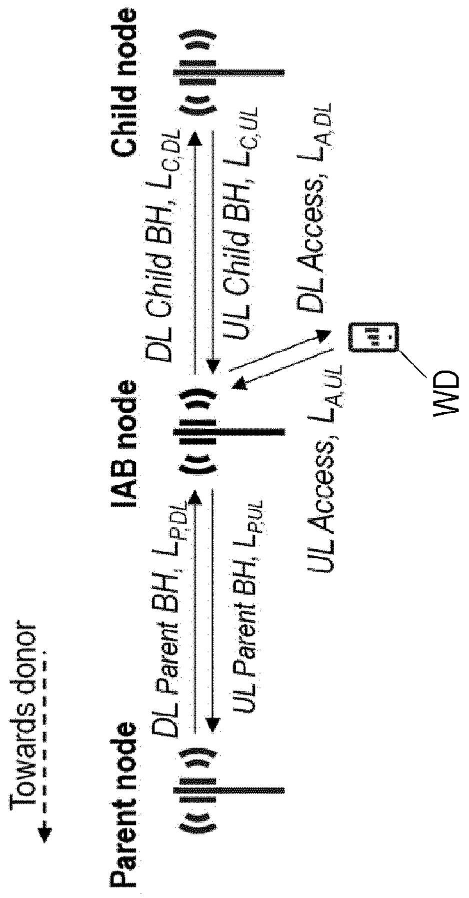
FIG. 2 is an example of IAB terminologies in adjacent hops.
Figure 3:
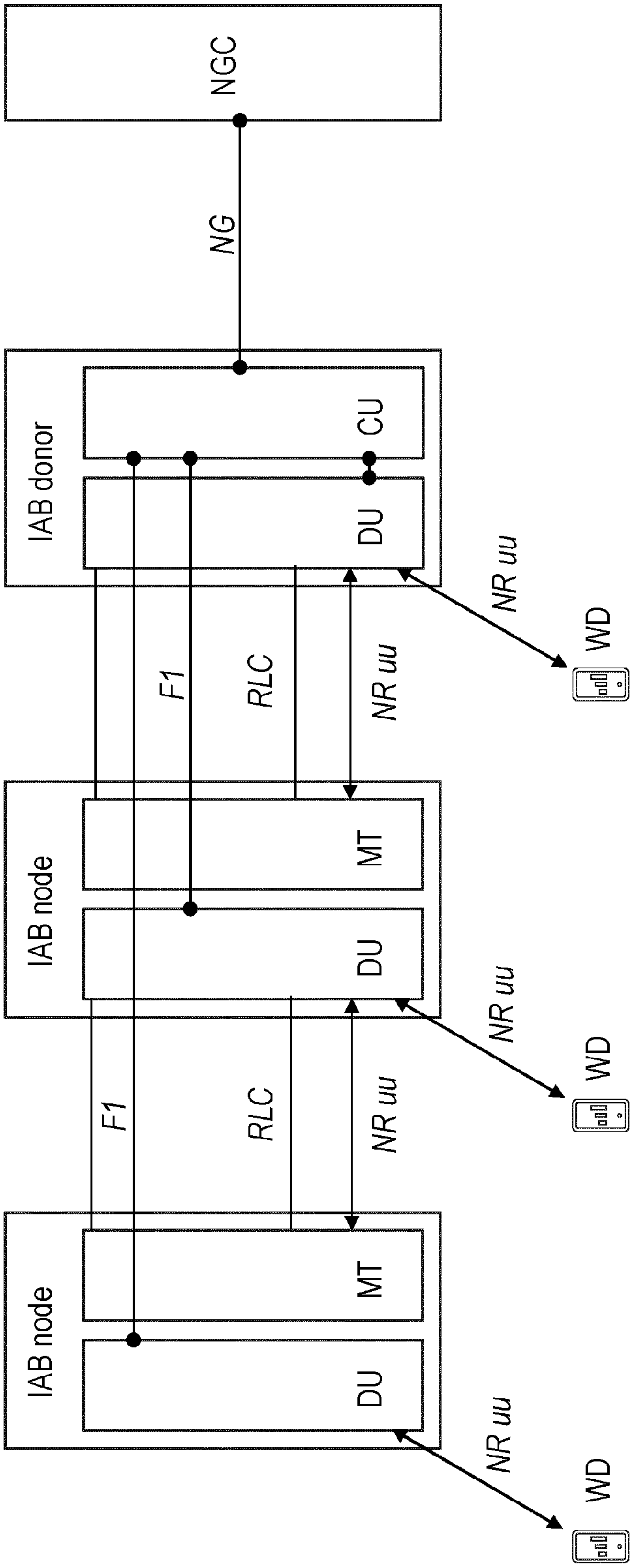
FIG. 3 is an example of an IAB architecture.
Figure 4:
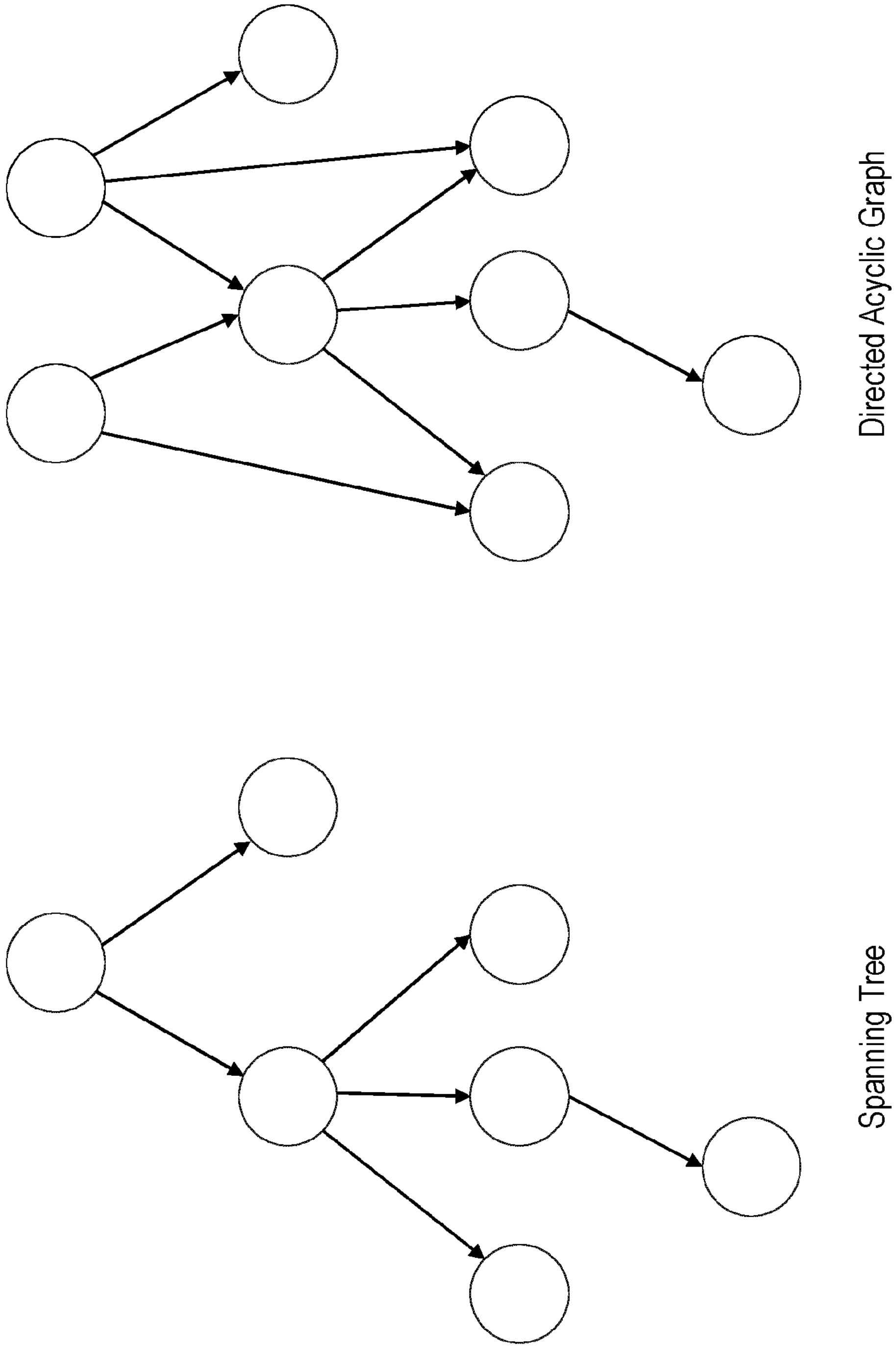
FIG. 4 shows example topologies for ST and DAG arrangements.
Figure 5:
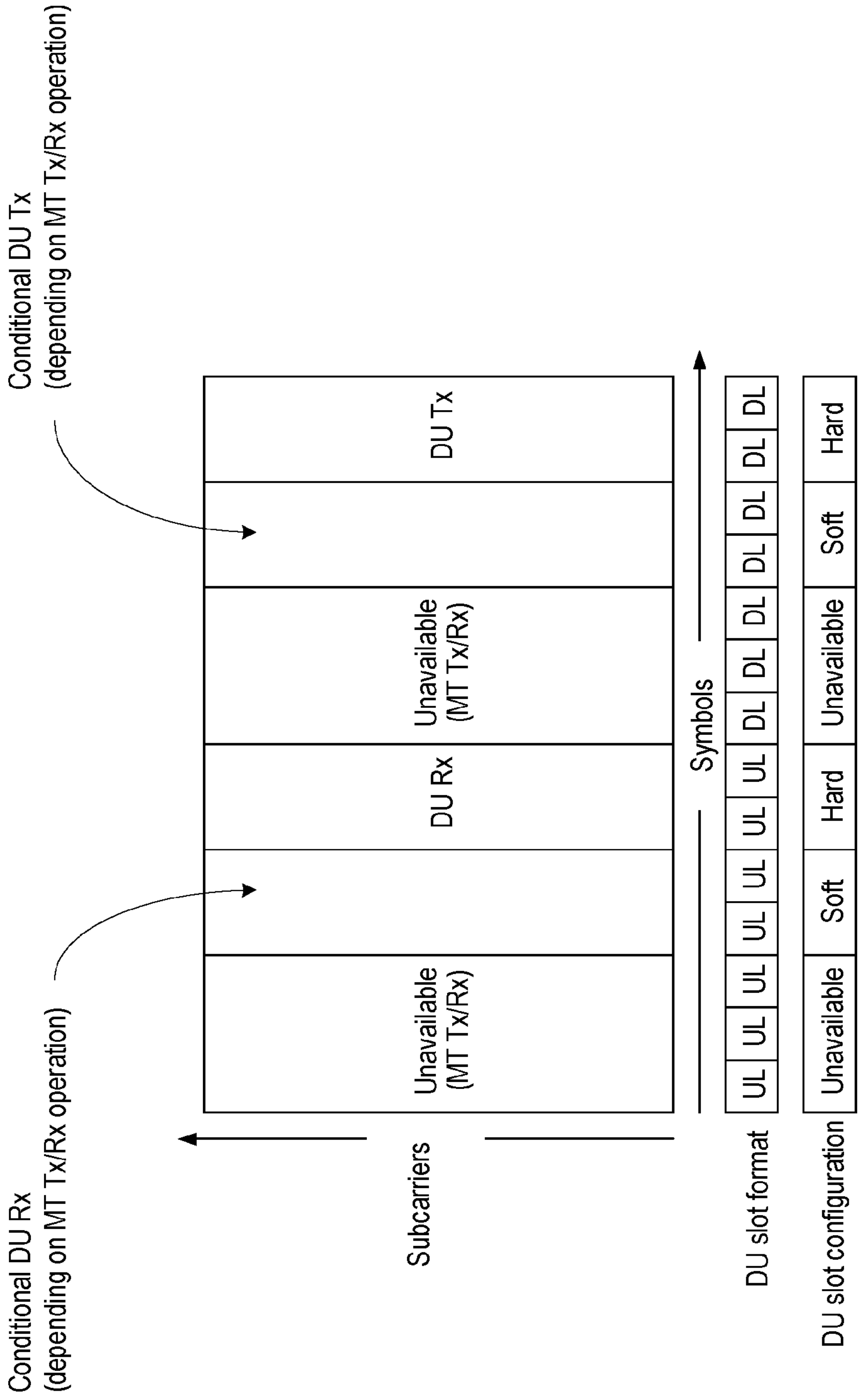
FIG. 5 is an example of a time-domain DU resource configuration.
Figure 6:
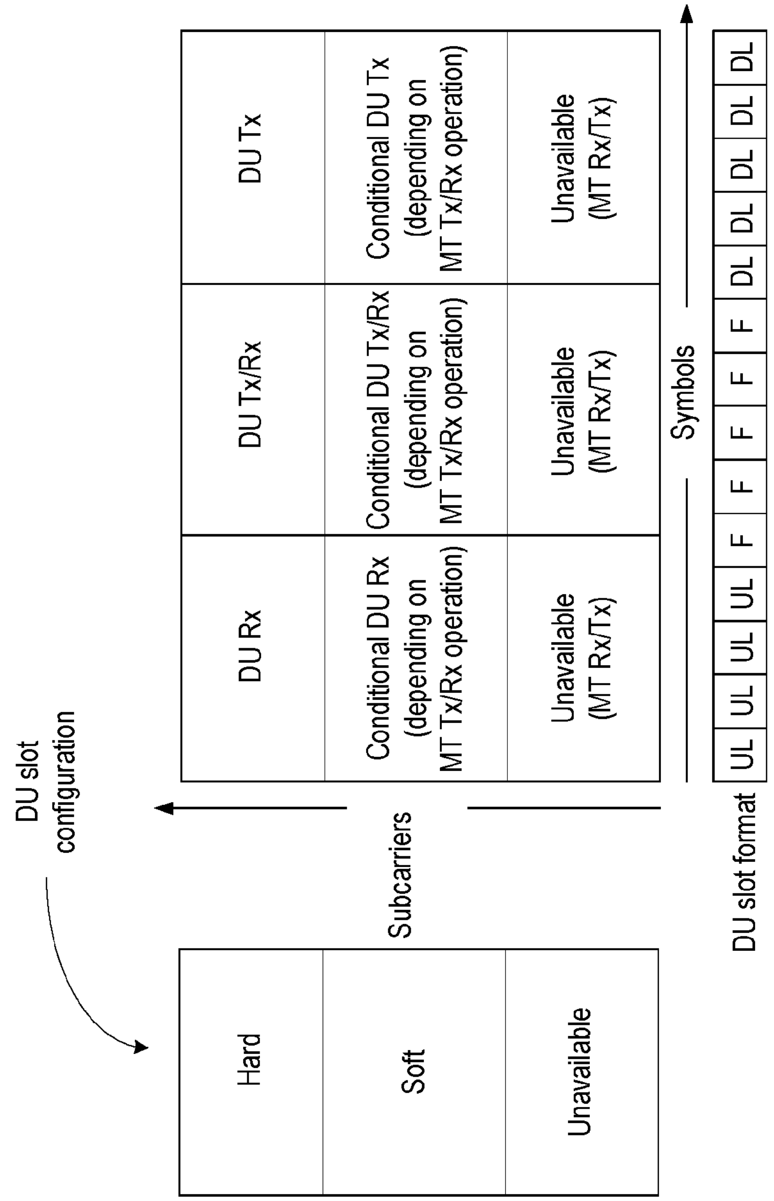
FIG. 6 is an example of a frequency-domain DU resource configuration.

3GPP Rel-16 IAB mainly considers a time-division multiplexing (TDM) case where the IAB-DU and IAB-MT resources of the same IAB-node are separated in time. 3GPP Rel-17 IAB may consider simultaneous operation of IAB-DU and IAB-MT, e.g., the frequency-domain multiplexing (FDM) and the spatial-domain multiplexing (SDM).

However, not all operational scenarios may be suitable for simultaneous operation, depending on other network configurations. For example, simultaneously receiving a weak WD transmission and a strong parent IAB-DU transmission may cause the WD transmission to be erroneously decoded. Hence, there is a need for methods to enable the co-existence of different multiplexing modes in one IAB node, at least on, for example, a slot-level. One idea could be to introduce a new attribute on the resource configuration type (besides the existing two attributes: UL/DL/FL and H/S/NA) in terms of multiplexing mode (e.g., TDM, FDM, SDM, etc.). The new attribute can be provided by the donor-CU to the IAB-node, together with the TDM/FDM resource configurations. However, this may not be considered a preferred solution due to the enormous signaling overhead. Hence, there is also a need for methods to determine a preferred resource configuration at the IAB-node without as much signaling overhead.

Some embodiments of the present disclosure may include a signaling scheme to IAB nodes to enable the IAB node to flexibly operate in simultaneous operation mode.

Some Embodiments May Provide for:

1. A method in an IAB node for determining resources for simultaneous operation, the method comprising one or more of:
   - a. Reporting multiplexing capability to a donor-CU;
   - b. Receiving a TDM and FDM configuration from the donor-CU;
   - c. Reporting multiplexing ability to the parent IAB-node;
   - d. Receiving activation signaling from the parent IAB-node on multiplexing mode;
   - e. Determining a preferred configuration from the FDM and TDM configurations; and/or
   - f. Applying the preferred configuration.
2. Some embodiments may include embodiment 1 and where a configuration may be one or more of:
   - a. FDM, if FDM is configured for the slot; and
   - b. TDM, if FDM is not configured for the slot.
3. Some embodiments may include embodiments 1 and 2 and where a configuration may include one or more of
   - a. TDM, if an FDM configuration is determined to have a configuration equivalent to a TDM configuration.
4. Some embodiments may include embodiments 1-3 and where a configuration may include:
   - a. TDM, if a fallback condition is fulfilled for the FDM configuration.
5. Some embodiments may include embodiment 4 and where the fallback condition is based on a timer expiring.

Some embodiments may advantageously allow for flexible and efficient configuration of simultaneous operation of IAB-MT and the co-located IAB-DU (e.g., within an IAB node), allowing optimized network performance and avoiding unacceptable interference conditions that may occur, e.g., by simultaneously performing or scheduling WD and IAB transmissions.

Before describing in detail example embodiments, it is noted that the embodiments reside primarily in combinations of apparatus components and processing steps related to determination of time- or frequency-domain HIS/NA for simultaneous operation in IAB. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a" "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, a parent network node (e.g., parent node), a child network node (e.g., child node), a CU (e.g., a donor-CU), a DU (e.g., IAB-DU), an MT (e.g., IAB-MT), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter, and the receiver is the WD. For the UL communication, the transmitter is the WD, and the receiver is the network node.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g., representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g., representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or gNodeB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g., transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g., WD) may comprise scheduling downlink and/or uplink transmissions for the terminal, e.g., downlink data and/or downlink control signaling and/or DCI and/or uplink control or data or communication signaling, in particular acknowledgement signaling, and/or configuring resources and/or a resource pool therefor. In particular, configuring a terminal (e.g., WD) may comprise configuring the WD to perform certain measurements on certain subframes or radio resources and reporting such measurements according to embodiments of the present disclosure.

The term resource used herein may correspond to any type of physical resource or radio resource expressed in terms of length of time. Examples of time resources are: symbol, time slot, sub-slot, subframe, radio frame, transmission time interval (TTI), interleaving time, etc. As used herein, in some embodiments, the terms "subframe," "slot," "sub-slot", "sub-frame/slot" and "time resource" are used interchangeably and are intended to indicate a time resource and/or a time resource number.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements related to determination of time- or frequency-domain H/S/NA for simultaneous operation in IAB.

Figure 7:
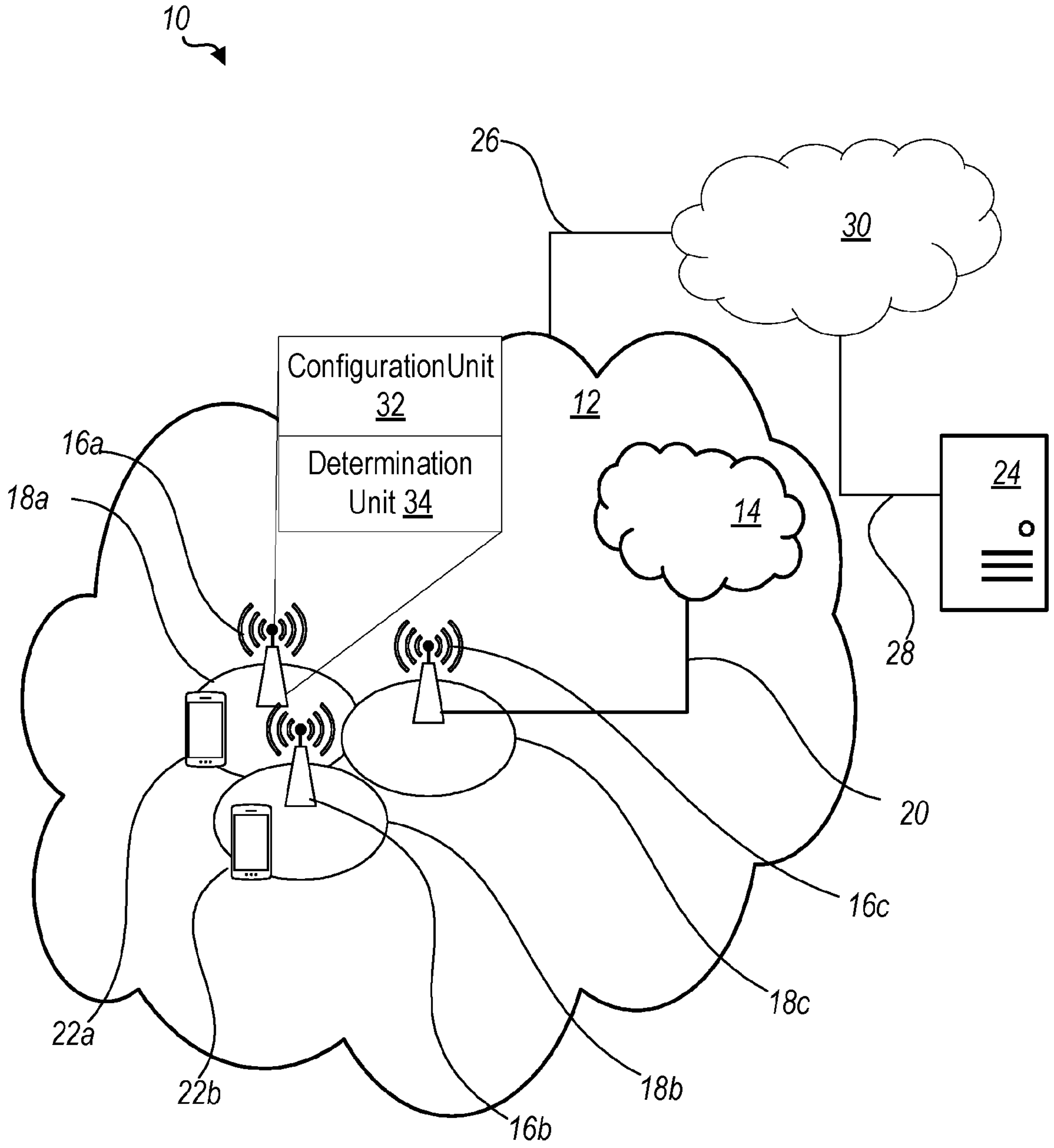
FIG. 7 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 7 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 7 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a configuration unit 32 which is configured to receive a first resource configuration for a first multiplexing capability and a second resource configuration for a second multiplexing capability; and receive signaling activating one of the first multiplexing capability and the second multiplexing capability. Network node 16 is configured to include a determination unit 34 which is configured to determine whether to use the activated one of the first multiplexing capability and the second multiplexing capability; and use one of the first resource configuration and the second resource configuration based on the determination.

Example implementations, in accordance with an embodiment, of the WD 22, network node 16 and host computer 24 discussed in the preceding paragraphs will now be described with reference to FIG. 8. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10. In some embodiments, radio interface 62 may be further configured to perform the process and/or tasks and/or methods and/or steps and/or functions for which communication interface 60 is configured, and vice versa (i.e., communication interface 60 may be further configured to perform the process and/or tasks and/or methods and/or steps and/or functions for which radio interface 62 is configured).

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 and determination unit 34 configured to perform network node/IAB node methods discussed herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 8:
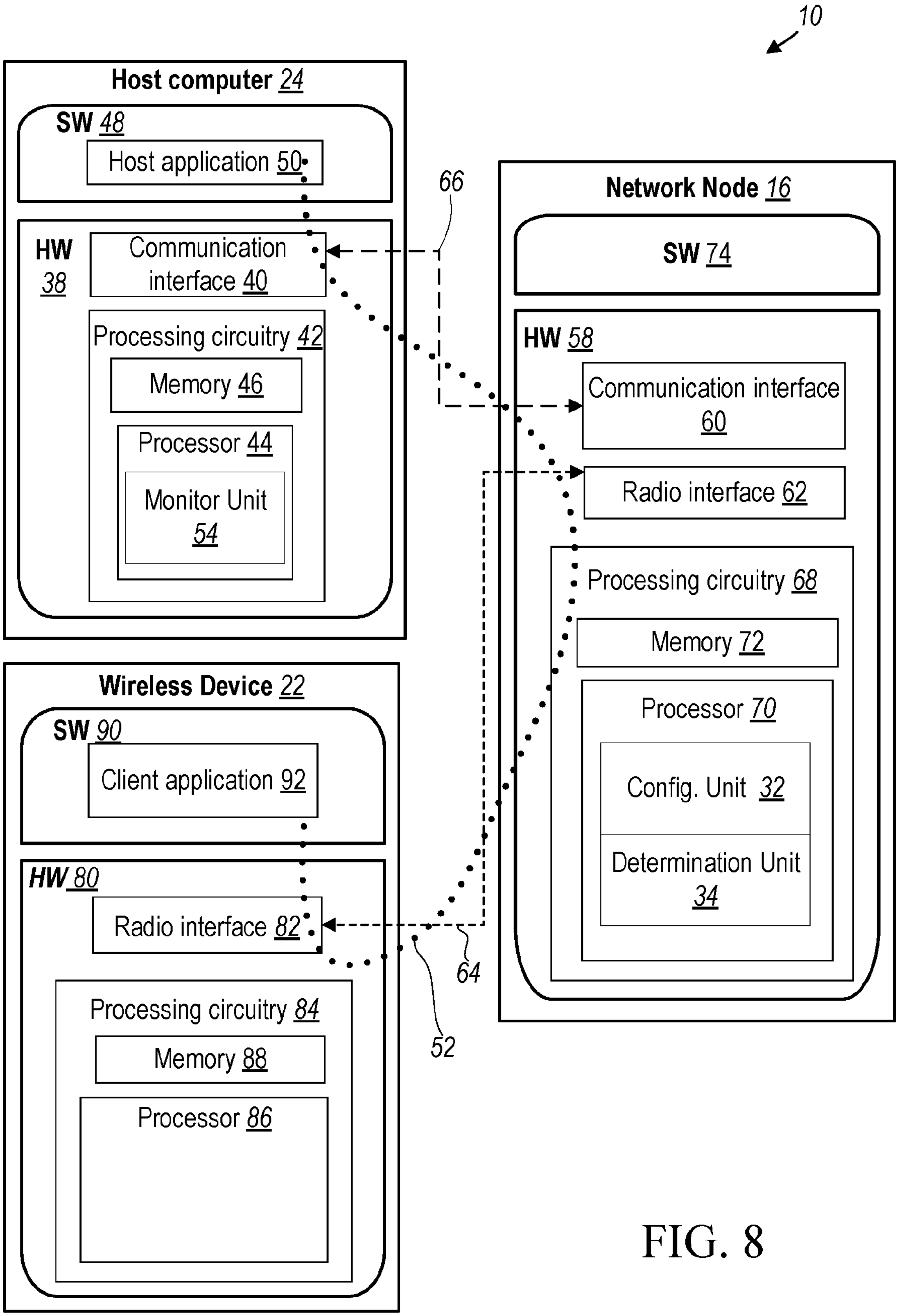
FIG. 8 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 8 and independently, the surrounding network topology may be that of FIG. 7.

In FIG. 8, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 7 and 8 show various "units" such as configuration unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 9:
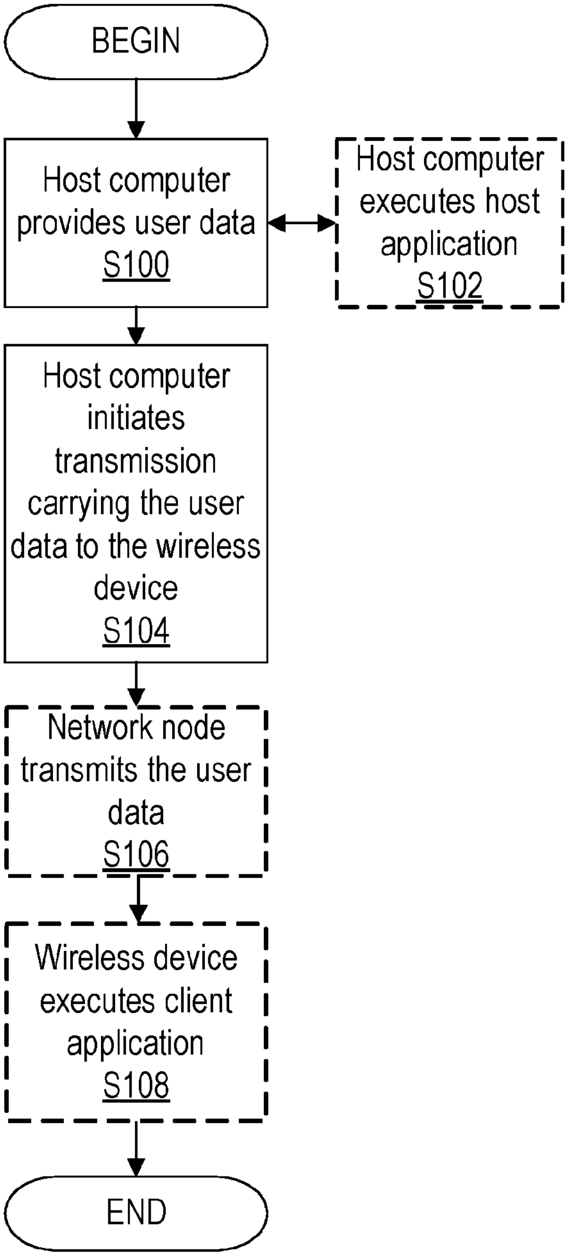
FIG. 9 is a flowchart illustrating example methods implemented in a communication system including a host computer, a network node and a wireless device for executing a client application at a wireless device according to some embodiments of the present disclosure.

FIG. 9 is a flowchart illustrating an example method implemented in a communication system, such as, for example, the communication system of FIGS. 7 and 8, in accordance with one embodiment. The communication system may include a host computer 24, a network node 16 and a WD 22, which may be those described with reference to FIG. 8. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 10:
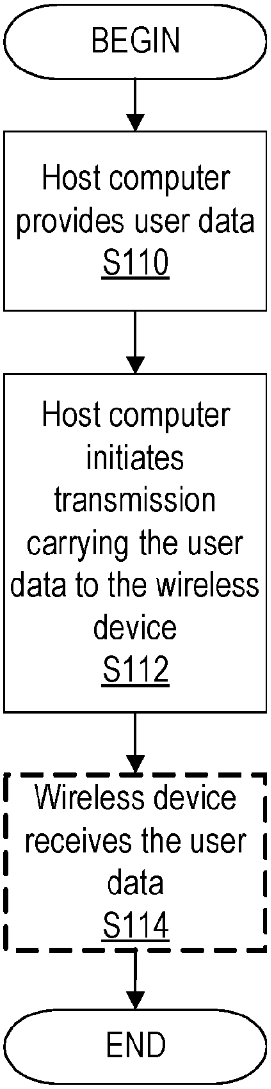
FIG. 10 is a flowchart illustrating example methods implemented in a communication system including a host computer, a network node and a wireless device for receiving user data at a wireless device according to some embodiments of the present disclosure.

FIG. 10 is a flowchart illustrating an example method implemented in a communication system, such as, for example, the communication system of FIG. 7, in accordance with one embodiment. The communication system may include a host computer 24, a network node 16 and a WD 22, which may be those described with reference to FIGS. 7 and 8. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 11:
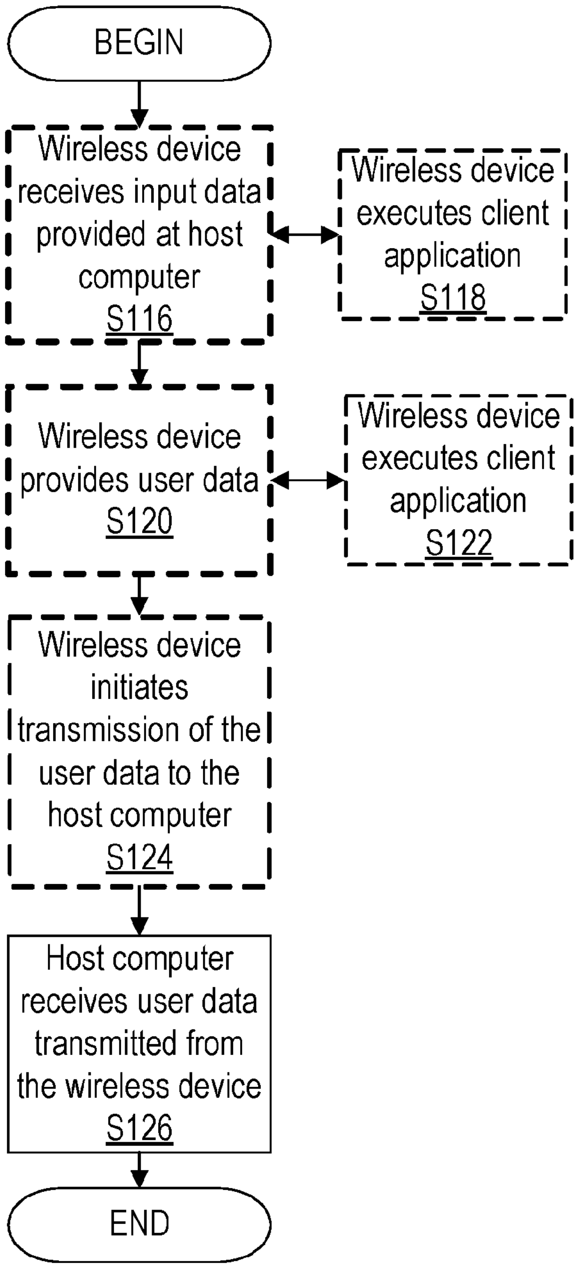
FIG. 11 is a flowchart illustrating example methods implemented in a communication system including a host computer, a network node and a wireless device for receiving user data from the wireless device at a host computer according to some embodiments of the present disclosure.

FIG. 11 is a flowchart illustrating an example method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 12:
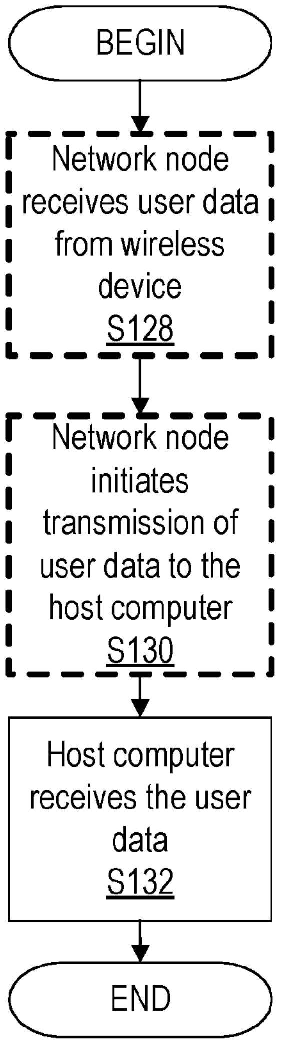
FIG. 12 is a flowchart illustrating example methods implemented in a communication system including a host computer, a network node and a wireless device for receiving user data at a host computer according to some embodiments of the present disclosure.

FIG. 12 is a flowchart illustrating an example method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 13:
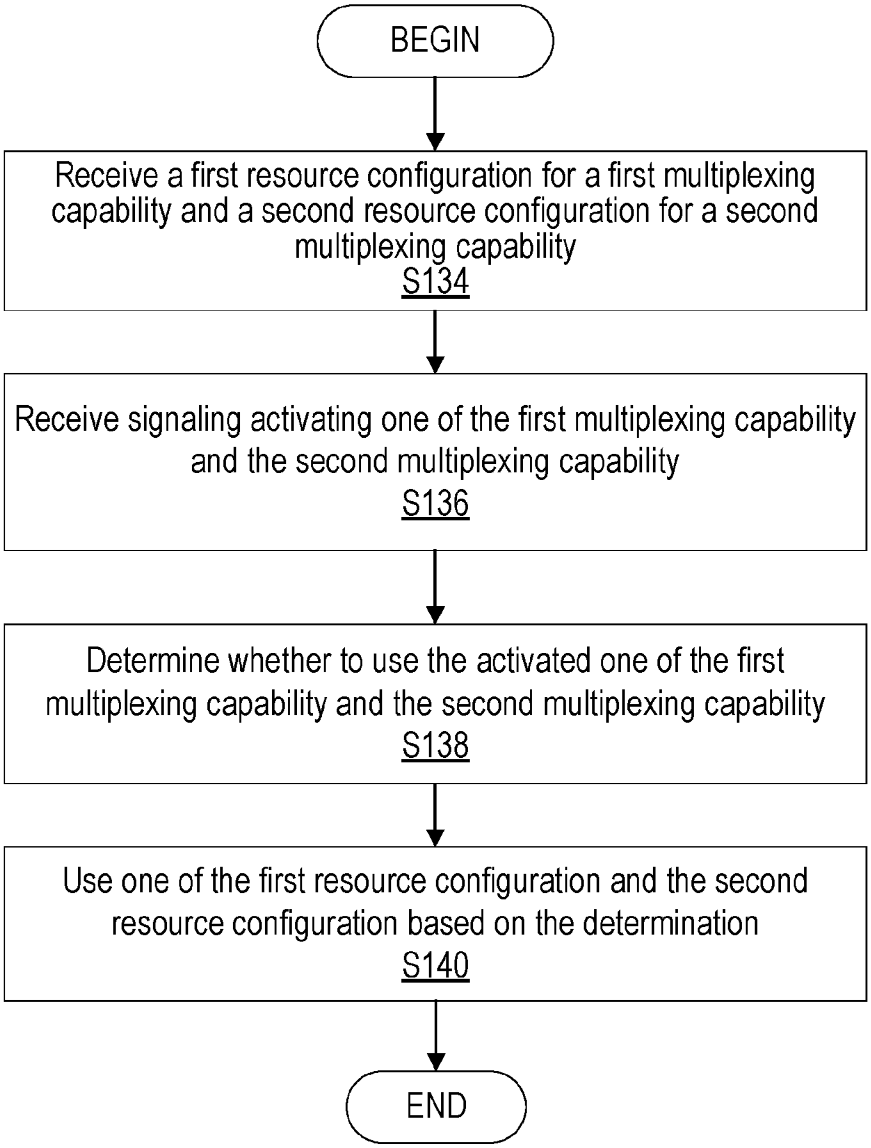
FIG. 13 is a flowchart of an example process in a network node according to some embodiments of the present disclosure.

FIG. 13 is a flowchart of an example process in a network node 16 according to some embodiments of the present disclosure. One or more Blocks and/or functions and/or methods performed by the network node 16 may be performed by one or more elements of network node 16 such as by configuration unit 32 and determination unit 34 in processing circuitry 68, processor 70, radio interface 62, etc. according to the example method. The example method includes receiving (Block S134), such as via configuration unit 32, determination unit 34, processing circuitry 68, processor 70 and/or radio interface 62, a first resource configuration for a first multiplexing capability and a second resource configuration for a second multiplexing capability. The method includes receiving (Block S136), such as via configuration unit 32, determination unit 34, processing circuitry 68, processor 70 and/or radio interface 62, signaling activating one of the first multiplexing capability and the second multiplexing capability. The method includes determining (Block S138), such as via configuration unit 32, determination unit 34, processing circuitry 68, processor 70 and/or radio interface 62, whether to use the activated one of the first multiplexing capability and the second multiplexing capability. The method includes using (Block S140), such as via configuration unit 32, determination unit 34, processing circuitry 68, processor 70 and/or radio interface 62, one of the first resource configuration and the second resource configuration based on the determination.

In some embodiments, the network node 16 is an integrated access and backhaul (IAB) node. In some embodiments, the first multiplexing capability is one of a time division multiplexing (TDM), frequency division multiplexing (FDM) and space-division multiplexing (SDM) and the second multiplexing capability is another one of the TDM, FDM and SDM. In some embodiments, the received first and second resource configurations are based on reported information about a multiplexing capability of the network node. In some embodiments, each of the first and second resource configurations indicate at least two attribute types, the first attribute type indicating whether resources are uplink, downlink or flexible and the second attribute type indicating whether resources are hard, soft or not available.

Figure 14:
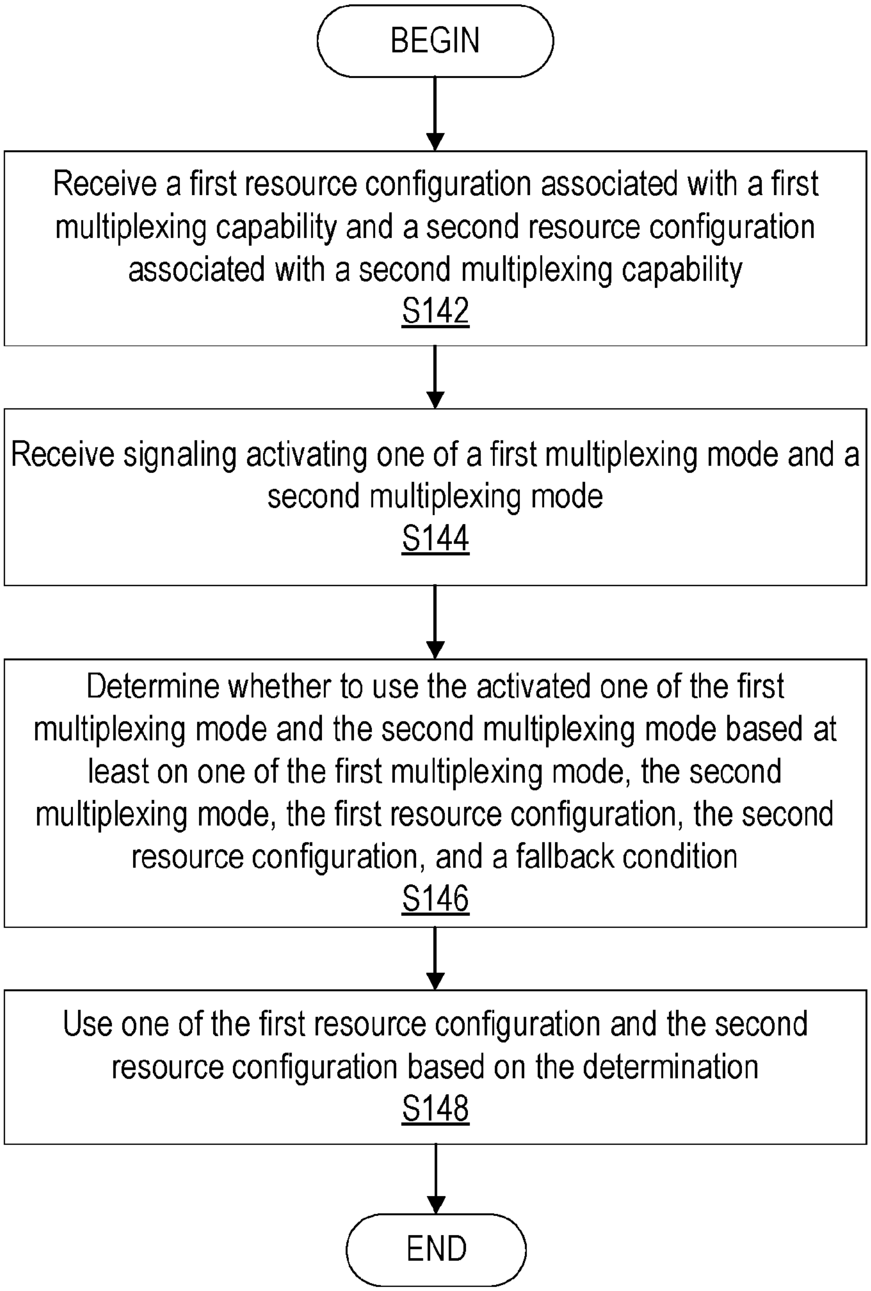
FIG. 14 is a flowchart of another example process in a network node according to some embodiments of the present disclosure.

FIG. 14 is a flowchart of another example process in a network node 16 according to some embodiments of the present disclosure. One or more Blocks and/or functions and/or methods performed by the network node 16 may be performed by one or more elements of network node 16 such as by configuration unit 32 and determination unit 34 in processing circuitry 68, processor 70, radio interface 62, etc. according to the example method. The example method includes receiving (Block S142), such as via configuration unit 32, determination unit 34, processing circuitry 68, processor 70 and/or radio interface 62, a first resource configuration associated with a first multiplexing capability and a second resource configuration associated with a second multiplexing capability. The method further includes receiving (Block S144), such as via configuration unit 32, determination unit 34, processing circuitry 68, processor 70 and/or radio interface 62, signaling activating one of a first multiplexing mode and a second multiplexing mode. In addition, the method includes determining (Block S146), such as via configuration unit 32, determination unit 34, processing circuitry 68, processor 70 and/or radio interface 62, whether to use the activated one of the first multiplexing mode and the second multiplexing mode based at least on one of the first multiplexing mode, the second multiplexing mode, the first resource configuration, the second resource configuration, and a fallback condition. The method further includes using (Block S140), such as via configuration unit 32, determination unit 34, processing circuitry 68, processor 70 and/or radio interface 62, one of the first resource configuration and the second resource configuration based on the determination.

In some embodiments, the method further includes: transmitting, to a donor network node, at least one of the first multiplexing capability and the second multiplexing capability; and transmitting, to at least one of a parent network node and a child network node, an ability to exploit the at least one of the first multiplexing capability and the second multiplexing capability.

In some other embodiments, the determination of whether to use the activated one of the first multiplexing mode and the second multiplexing mode includes determining whether one of the first multiplexing mode and the second multiplexing mode is configured for at least one of a time slot and a symbol.

In an embodiment, the determination of whether to use the activated one of the first multiplexing mode and the second multiplexing mode includes determining whether the first resource configuration and the second resource configuration are equivalent.

In another embodiment, the determination of whether to use the activated one of the first multiplexing mode and the second multiplexing mode includes determining whether the fallback condition is fulfilled, where the fallback condition is associated with at least one of a timer expiration, an unsupported multiplexing mode, and operational conditions.

In some embodiments, the activating one of the first multiplexing mode and the second multiplexing mode is signaled one of implicitly and explicitly.

In some other embodiments, the network node is an integrated access and backhaul (IAB) node configured to simultaneously communicate at least with one parent network node and one child network node. The parent network node is a parent IAB node, and the child network node is a child IAB node.

In an embodiment, the first multiplexing capability is one of a time division multiplexing (TDM), a frequency division multiplexing (FDM), and a space-division multiplexing (SDM). The second multiplexing capability is another one of the TDM, the FDM, and the SDM.

In another embodiment, the received first and second resource configurations are based on reported information about the first and second multiplexing capabilities of the network node, respectively.

In some embodiments, each of the first and second resource configurations indicate at least two attribute types. A first attribute type indicates whether resources are associated with at least one of an uplink, a downlink, and a flexible configuration, and a second attribute type indicates whether resources are at least one of hard, soft, and not available.

Figure 15:
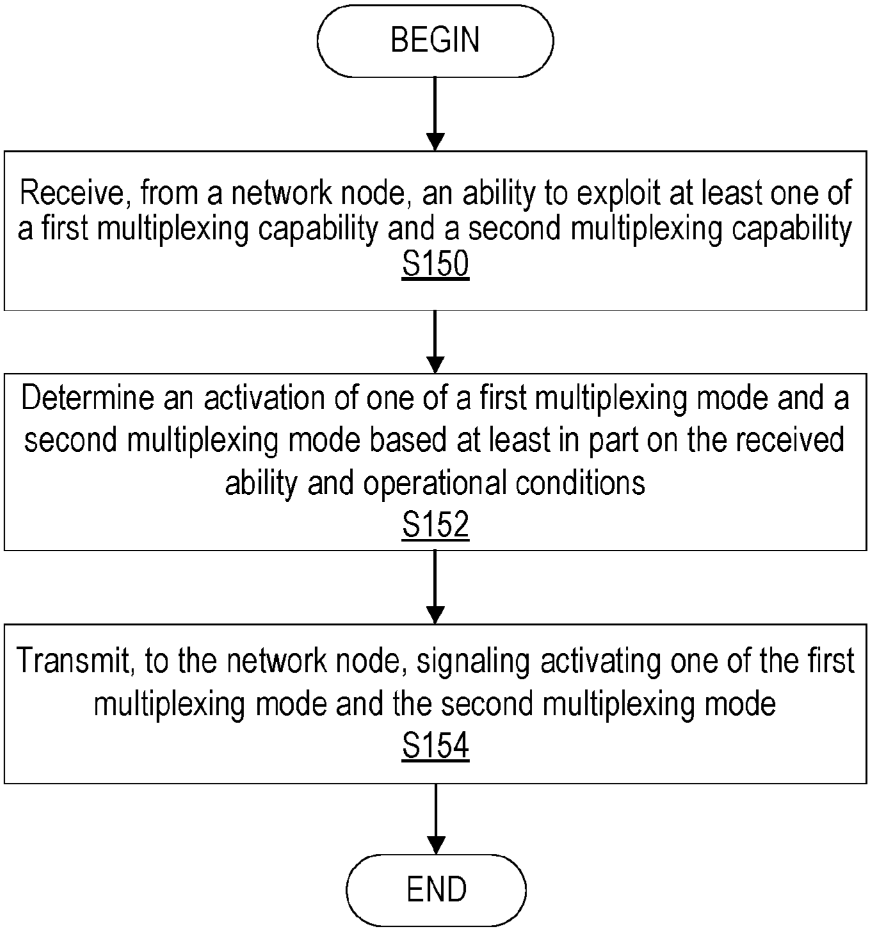
FIG. 15 is a flowchart of an example process in a parent network node according to some embodiments of the present disclosure.

FIG. 15 is a flowchart of an example process in a network node 16 (e.g., a parent network node) according to some embodiments of the present disclosure. One or more Blocks and/or functions and/or methods performed by the network node 16 may be performed by one or more elements of network node 16 such as by configuration unit 32 and determination unit 34 in processing circuitry 68, processor 70, radio interface 62, etc. according to the example method. The example method includes receiving (Block S150), such as via configuration unit 32, determination unit 34, processing circuitry 68, processor 70 and/or radio interface 62, from a network node, an ability to exploit at least one of a first multiplexing capability and a second multiplexing capability. The method further includes determining (Block S152), such as via configuration unit 32, determination unit 34, processing circuitry 68, processor 70 and/or radio interface 62, an activation of one of a first multiplexing mode and a second multiplexing mode based at least in part on the received ability and operational conditions. In addition, the method includes transmitting (Block S154), such as via configuration unit 32, determination unit 34, processing circuitry 68, processor 70 and/or radio interface 62, to the network node, signaling activating one of the first multiplexing mode and the second multiplexing mode.

In some embodiments, the method further includes receiving, from a donor network node, at least one of the first multiplexing capability and the second multiplexing capability of the network node.

In some other embodiments, each of first and second resource configurations associated with the first and second multiplexing capabilities, respectively, indicates at least two attribute types. A first attribute type indicates whether resources are associated with at least one of an uplink, a downlink, and a flexible configuration, and a second attribute type indicates whether resources are at least one of hard, soft, and not available.

In an embodiment, the operational conditions include at least one of a timing, a power control, and a cross-link interference.

In some embodiments, the ability is associated with at least one of a time division multiplexing (TDM), a frequency division multiplexing (FDM), and a space-division multiplexing (SDM).

In an embodiment, the ability is associated with at least one of a mobile termination and a distributed unit and at least one of a transmission and a reception of signaling.

In another embodiment, the activating one of the first multiplexing mode and the second multiplexing mode is signaled one of implicitly and explicitly.

In some embodiments, the parent network node is a parent integrated access and backhaul (IAB) node, and the network node is an IAB node configured to simultaneously communicate at least with the parent network node and one child network node, the child network node being a child IAB node Having described the general process flow of arrangements of the disclosure and having provided examples of hardware and software arrangements for implementing the processes and functions of the disclosure, the sections below provide details and examples of arrangements for determination of time- or frequency-domain H/S/NA for simultaneous operation in IAB, which may be implemented by the network node 16, wireless device 22 and/or host computer 24.

Figure 16:
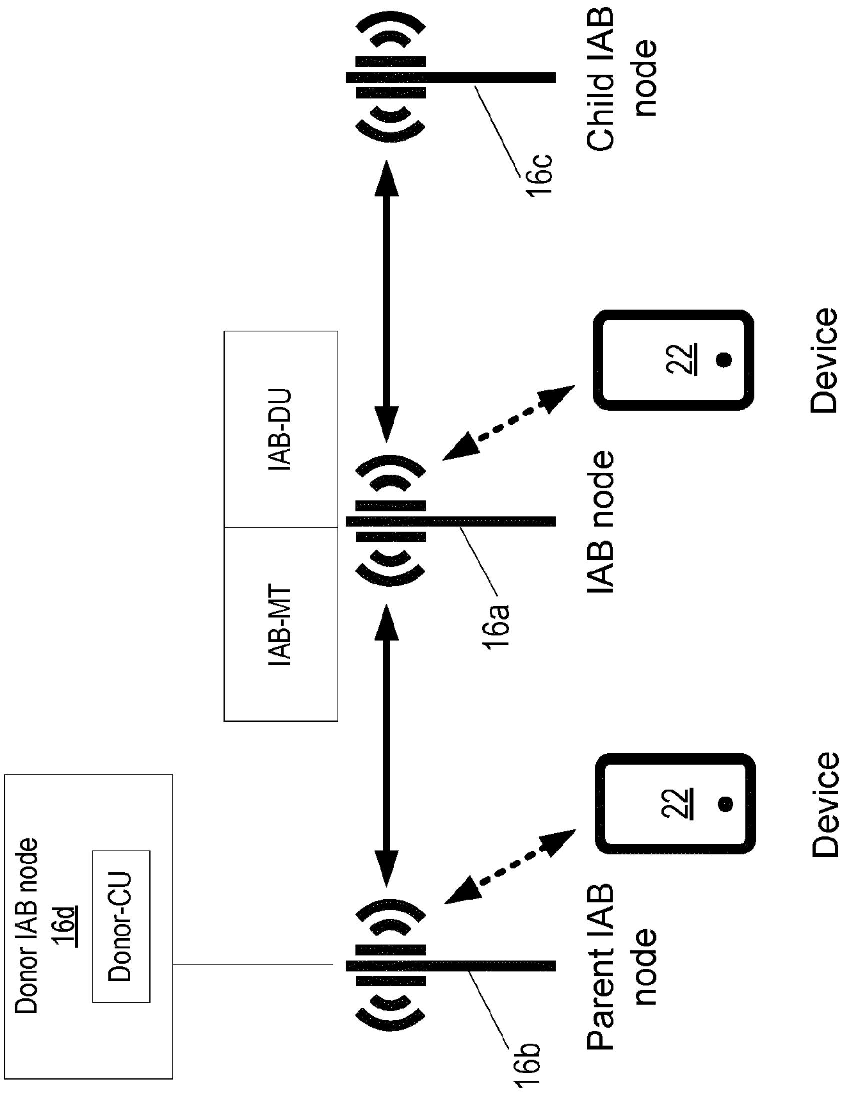
FIG. 16 is an example illustration of node relations in an IAB network according to some embodiments of the present disclosure.

FIG. 16 is an illustration of node relations in an IAB network. The context of some embodiments of the present disclosure is an IAB network where an IAB node (e.g., network node 16*a*, also referred to as IAB node 16*a*) may be connected upstream to a parent IAB node (e.g., network node 16*b*, also referred to as parent IAB node 16*b*) and downstream to a device (e.g., WD 22) and/or a child IAB node (e.g., network node 16*c*, also referred to as child IAB node 16*c*). The parent IAB node 16*b* may, in turn, also connect a device (e.g., WD 22), or other IAB nodes (e.g., network nodes 16).

Figure 17:
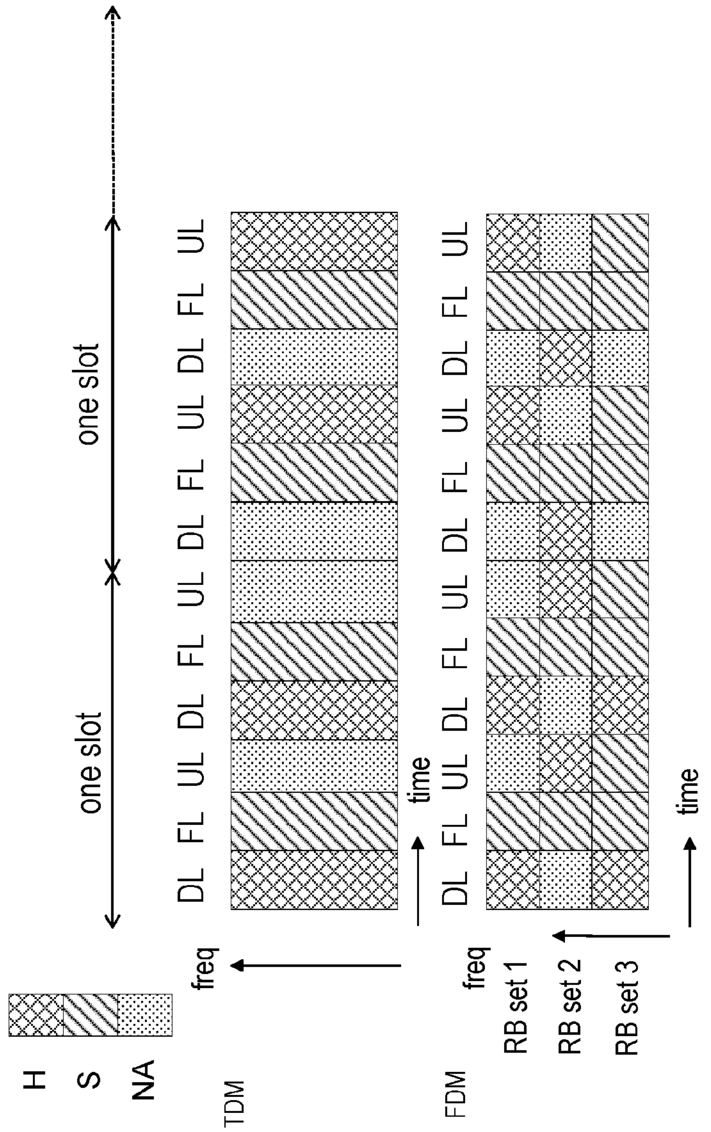
FIG. 17 is an example of semi-static resource configurations for TDM and FDM according to some embodiments of the present disclosure.

FDM Aspect:

After initial access, the IAB node 16*a* may be provided by the donor-CU 16*d* the semi-static resource configuration which includes two types of attributes: UL/DL/FL and H/S/NA. As illustrated in FIG. 17, for a certain slot, the UL/DL/FL configuration will be identical, regardless of TDM or FDM operation modes. For TDM operation, for each symbol, H/S/NA configuration applies to entire bandwidth of the serving cell. For FDM operation, the entire bandwidth of the serving cell can be further partitioned and the minimum resource size for configuring the frequency domain HIS/NA is a set of N Resource Blocks (RBs). In FIG. 17, in order to enable FDM operation, the frequency resources of the serving cell are additionally partitioned into one or more RB-Sets. In FIG. 17, three sets have been used to illustrate Hard, Soft or Not Available resource configurations, but it should be understood that not all three need to be configured, and multiple sets for each configuration may additionally be configured.

FIG. 17 illustrates an example of semi-static resource configurations for TDM and FDM. The TDM H/S/NA configuration applies to the entire bandwidth of the serving cell. The FDM H/S/NA has a configuration granularity of RB-Sets.

SDM Aspect

Considering the 3GPP Rel-16 HIS/NA resource configuration, a Hard configuration implies that the IAB-DU cell, e.g., via network node 16, unconditionally can use the symbol; Soft, that the IAB-DU cell conditionally can use the symbol; and Not Available that the IAB-DU cannot use the symbol at all (some exceptions for, e.g., cell-specific signals apply). Generalizing these constraints to both time and frequency domain implies that the IAB-DU and IAB-MT may only simultaneously operate in Soft (time and/or frequency) resource—for an IAB configured to operate in SDM, soft resource may be available for space domain simultaneous operation through implicit indication. This means resources for SDM are available in:

FDM Soft resources; and

TDM Soft resources for IAB-nodes 16 that do not require TDM.

Aspects of differentiating configuration with respect to both multiplexing modes and traffic types (access or backhaul) among different slots may be considered. Besides providing semi-static multiplexing capability to the IAB-donor-CU 16*d*, the IAB-node 16*a* may also evaluate dynamic changes of the multiplexing capability and updates associated information to the parent IAB nodes 16*b*.

Figure 18:
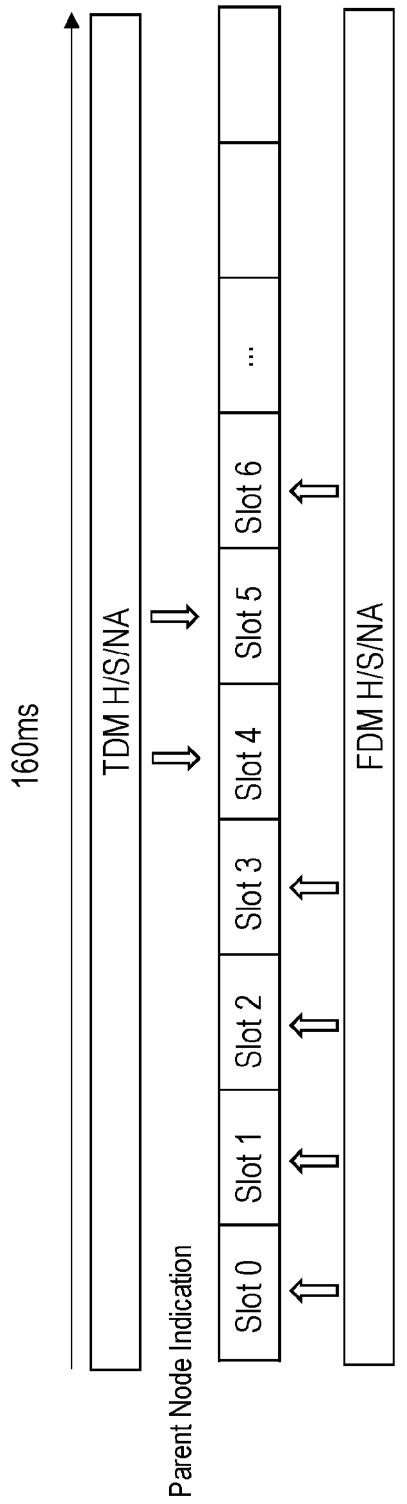
FIG. 18 is an example of an IAB-node provided with both time- and frequency-domain H/S/NA configurations according to some embodiments of the present disclosure.

Generally speaking, it is beneficial to have HIS/NA resources for an IAB-DU 16*a* configured based on the multiplexing capability of the IAB-node 16*a*, which is typically provided from the IAB-node 16*a* to the IAB-donor-CU 16*d* via F1 signaling. In an operational network, the ability to exploit the multiplexing capability of the IAB-node 16*a* may change locally and dynamically. Such a change may not be captured by the IAB-donor-CU 16*d* in time. Also, from the system stability, consistency and signaling efficiency points-of-view, semi-static resource configuration is not supposed to be changed frequently. It could happen that the semi-static resource configuration becomes inconsistent with an updated IAB multiplexing ability, and accordingly the intended H/S/NA configuration cannot be used by the IAB-node 16*a*. For example, when the conditions for simultaneous transmission or reception temporarily fail, the IAB-node 16*a* could smoothly fall back and operate in a TDM mode, without causing radio link failure. It may therefore be useful to always provide both time- and frequency-domain H/S/NA to the IAB-node 16*a* (from donor-CU 16*d*, via F1 signaling) as illustrated in FIG. 18. Meanwhile, for a certain slot either a TDM or FDM configuration, e.g., H/S/NA, may be applied. For example, a TDD periodicity (e.g., 160 ms) may be used. A parent indication may be provided (e.g., such as the induction corresponding to slots 4 and 5). A DL power control may be provided (e.g., where the DL power control is provided for each on of slot 0, slot 1, slot 2, slot 3, and slot 6, and the DL power control is not provided for slot 4 and slot 5). A plurality of timing cases (e.g., associated with a timing indication) may be used, e.g., where case 1 corresponds to slot 4 and slot 5; case 6 corresponds to slot 0, slot 1, slot 2, and slot 3; and case 7 corresponds slot 6. Case 1/6/7 (and/or any other case numbers) may refer to one or more timing cases.

On the other hand, the parent IAB-node 16*b* may be made aware of dynamic changes of the ability to exploit the multiplexing capability of the IAB-node 16*a*, such as changes of propagation channel, fulfilment of simultaneous operation criteria, etc. Losing track of such change may lead to inappropriate scheduling decision at the parent IAB node 16*b*, which may cause resource wastage or situations with additional interference for the IAB-node 16*a*. In Rel-16 IAB, the IAB-node 16*a* indicates "TDM not required" to the IAB-donor-CU 16*d*, which will configure IAB-MT and IAB-DU resources accordingly to allow for the desired simultaneous operation. However, the required Case #6 and Case #7 timing operation cannot always be fulfilled by the parent IAB node(s) 16*b* and/or child IAB node(s) 16*c* under certain circumstances. In this case, the IAB-MT and IAB-DU (e.g., co-located in the IAB node 16*a*) may be limited to operate in a TDM manner. Without knowing the dynamic conditions or abilities of the IAB node 16*a*, the parent IAB node 16*b* may still schedule transmission from/to the IAB-MT which cannot be carried out by the IAB-node 16*a* due to the operation at the IAB-DU using overlapping time and/or frequency resource. Therefore, whether (or not) to switch to simultaneous operation modes may be based on the activation signaling from the parent IAB-node 16*b*.

In some embodiments, to reduce the signaling overhead, the activation signaling could be only based on the operational conditions, without taking the semi-static resource configuration into consideration. Below are two solutions that may enable the IAB-node 16*a* to determine the TDM or FDM configurations based on the semi-static configurations from the donor-CU 16*d* and the activation signaling from the parent IAB-node 16*b*.

Embodiment 1

Figure 19:
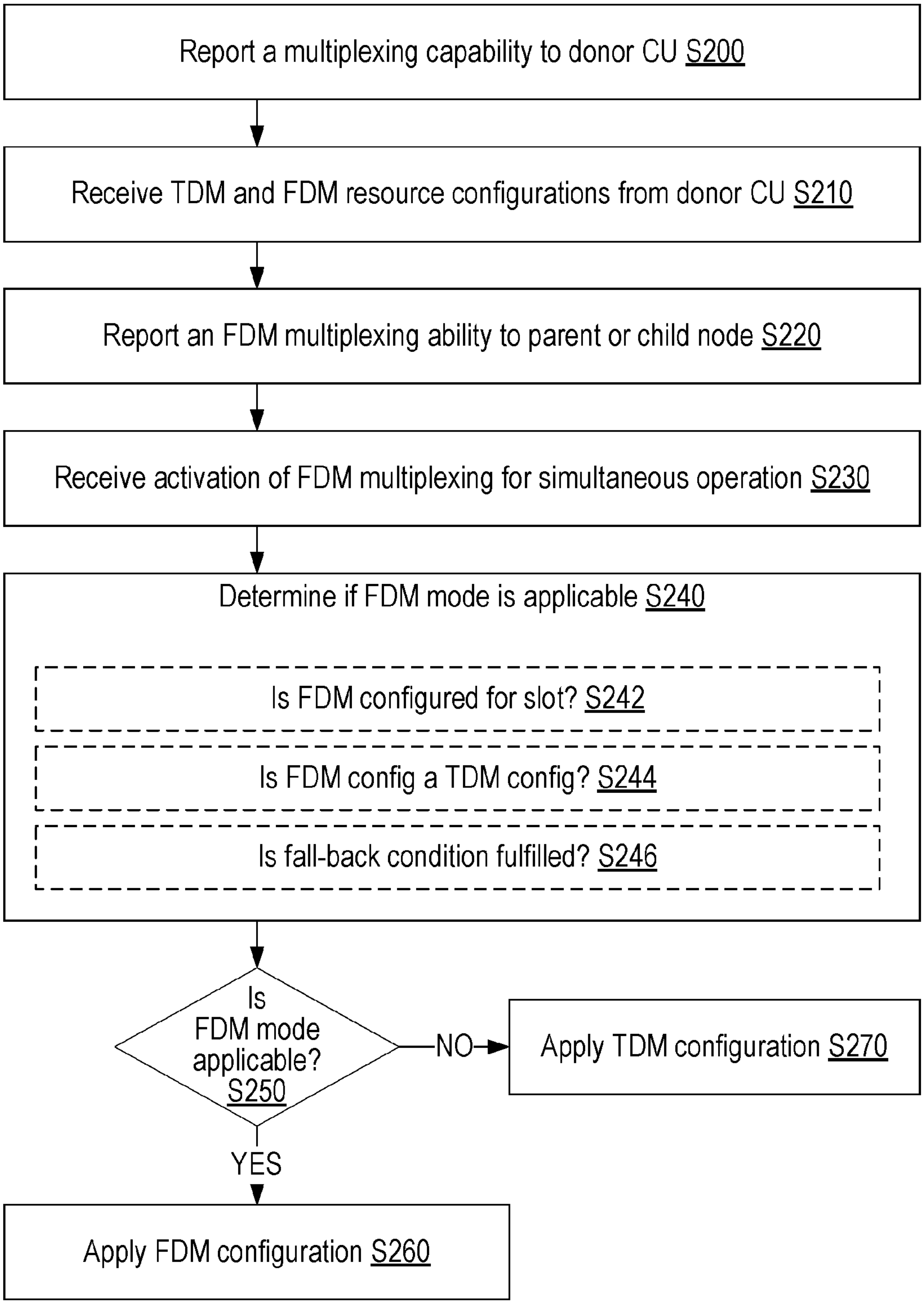
FIG. 19 is an example flow chart of an embodiment of the present disclosure.

Some embodiments of the present disclosure include a method to distinguish between FDM and TDM operation in an IAB node 16*a* that is capable of simultaneous transmission, see FIG. 19 for example.

In a first step (S200), the IAB-node 16*a* reports its multiplexing capability to the donor-CU 16*d* via F1 signaling.

The multiplexing capability can be two or more of the following:
- time-division multiplexing (TDM);
- frequency-division multiplexing (FDM); or
- space-division multiplexing (SDM).

Alternatively, or additionally, the multiplexing capability can include one or more of the following:
- capable of simultaneous transmission (TX) of IAB-MT and IAB-DU;
- capable of simultaneous reception (RX) of IAB-MT and IAB-DU;
- capable of simultaneous TX and RX of IAB-MT and IAB-DU, respectively;
- capable of simultaneous RX and TX of IAB-MT and IAB-DU, respectively; or
- incapable of any simultaneous operation.

Alternatively, or additionally, the multiplexing capability can include one of the following:
- TDM required; or
- TDM not required.

Alternatively, or additionally, multiplexing capabilities may be conditioned on timing capabilities, such that, e.g., simultaneous Tx is conditioned (or not) on a timing (e.g., Case-6 timing) (aligned MT/DU transmissions) or simultaneous Rx is conditioned (or not) on another case timing (e.g., Case-7 timing) (aligned MT/DU reception).

In the second step (S210), the donor-CU 16*d* provides both TDM and FDM resource configurations to IAB-DU, via F1 signaling. The TDM H/S/NA and FDM HIS/NA can be completely independent. In an alternate embodiment, the donor-CU 16*d* can additionally provide IAB-DU with SDM related configuration, e.g., SDM specific Transmission Configuration Indicator (TCI) configurations, SDM specific IAB-DU beam restrictions.

Steps (S200) and (S210) may include the configuration phase and are performed on initialization or periodically but rarely in relation to the subsequent steps. The following steps describe some embodiments of the disclosure during operation, i.e., the steps are repeatedly performed more often than the configuration steps above.

In a third step (S220), the parent IAB-node 16*b* is informed, dynamically, about the IAB-node's 16*a* ability to exploit the multiplexing capability. The parent IAB node 16*b* may determine the multiplexing mode based on the operational conditions, such as timing, power control, cross-link interference, etc. In an alternate embodiment, the ability reporting can be one or more of TDM, FDM, SDM, etc. In another alternate embodiment, the ability reporting can be one of more of: (e.g., simultaneous) MT TX/DU TX, MT TX/DU RX, MT RX/DU TX, MT RX/DU RX.

Subsequently, in (S230), the IAB-node 16*a* will be informed about the switch of multiplexing mode by an activation signaling from the parent IAB-node 16*b*. For the purpose of some embodiments of the present disclosure, it is assumed that FDM is activated. But that may not always be the case, in which case, the IAB node 16*a* may resort to TDM operation, applying the TDM resource configuration.

Assuming FDM mode is activated, the IAB-node 16*a* determines if the FDM mode is applicable (S240). There may be several reasons why FDM is not applicable as presented in the following embodiments:

In one embodiment (S242), the IAB node 16*a* determines if FDM is configured for the slot or symbol for which the determination applies.

In one embodiment (S244), the IAB node 16*a* determines if the FDM configuration is in fact equivalent to a TDM configuration (i.e., a time/frequency resource configuration does not differentiate frequency resources), or is equivalent to the provided TDM configuration, for the slot or symbol for which the determination applies. In this case, the FDM mode may be handled as a TDM mode operation, with respect to, e.g., timing, transmit power and interference assumptions for the slot or symbol for which the determination applies. In doing so, the IAB node 16*a* may fallback to TDM operation for individual slots or symbols in order for its operation to be compatible with other nodes not capable of simultaneous operation.

In one embodiment (S246), the IAB node 16*a* determines if a fallback condition applies, in which case the TDM configuration may anyway be applied for the slot or symbol for which the determination applies. The fallback condition can, e.g., be a timer such that the FDM configuration is invalidated after a certain time or a certain number of slots or subframes from receiving or applying the FDM activation signaling.

Based on the determination (S240), the IAB node 16*a* decides whether the FDM mode is applicable or not; if so, it applies the FDM configuration (S260) and if not, it applies the TDM configuration (S270).

Figure 20:
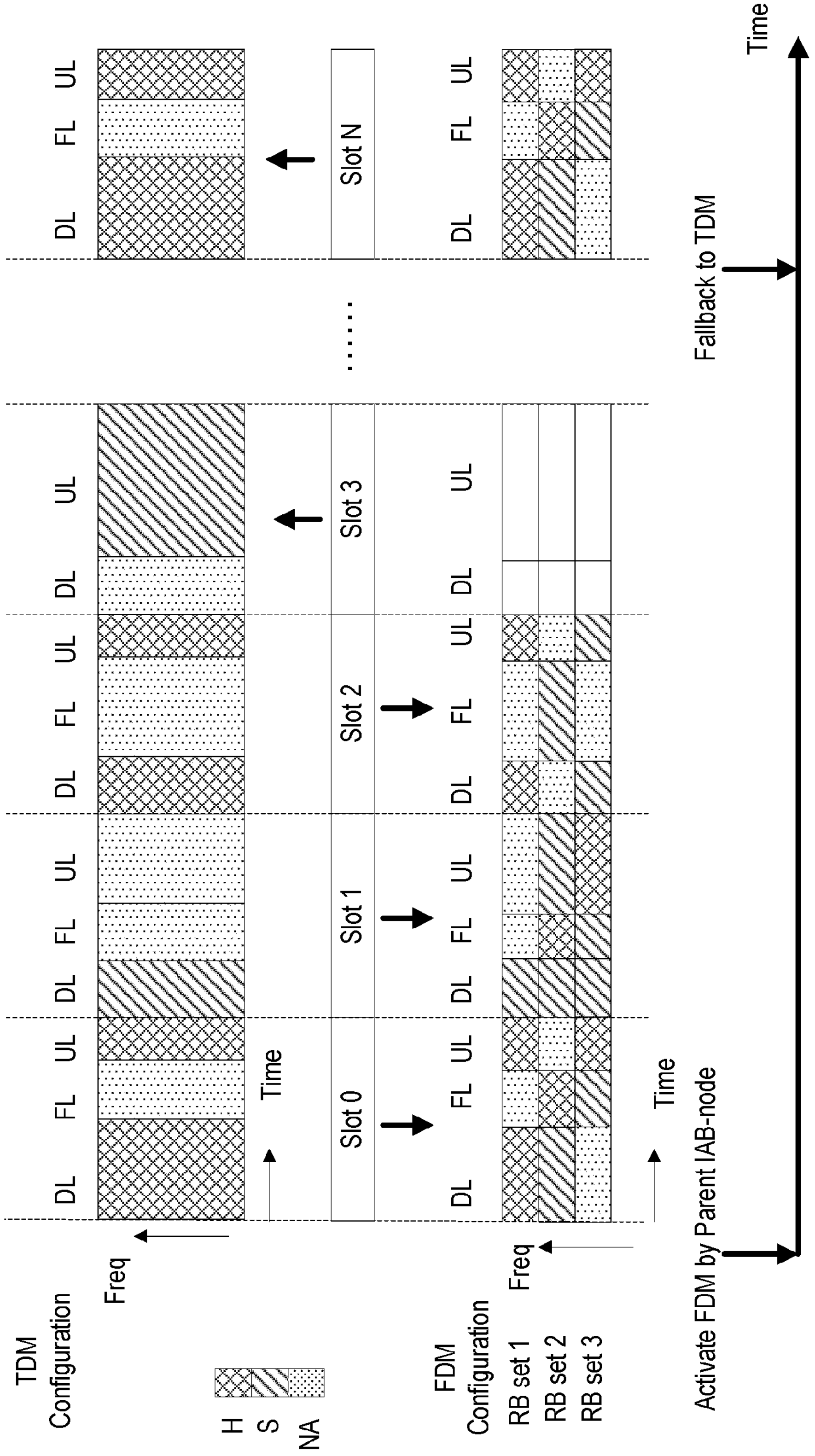
FIG. 20 is an example illustration of when FDM mode is activated by the parent IAB-node according to some embodiments of the present disclosure.

An illustrative example of (S242) can be found in FIG. 20. In this case, when the FDM mode is activated by the parent IAB-node 16*b*, the IAB-node 16*a* will apply the FDM configuration if the FDM configuration is provided, see Slot 0-Slot 2; otherwise (e.g., the FDM configuration is not provided), the IAB-node 16*a* may apply the TDM configuration, see Slot 3. The IAB-node 16*a* may apply the TDM configuration when it falls back to TDM, see Slot N.

FIG. 20 is an example showing that, when FDM mode is activated by the parent IAB-node 16*b*, the IAB-node 16*a* applies the FDM configurations if the FDM configurations are provided, otherwise, the IAB-node 16*a* should apply the TDM configurations.

Figure 21:
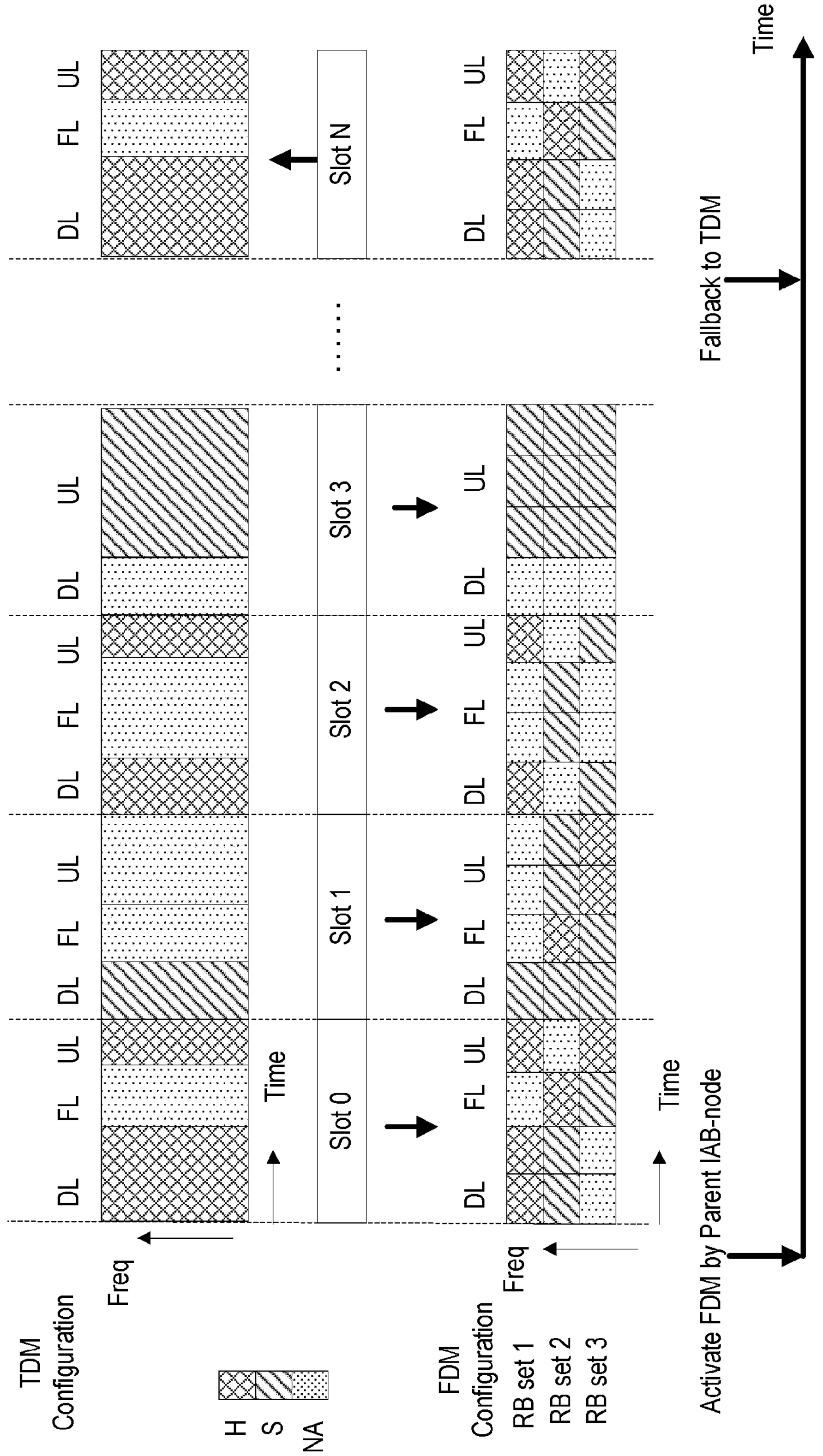
FIG. 21 is yet another example illustration of when FDM mode is activated by the parent IAB-node according to some embodiments of the present disclosure.

In the alternate embodiment (S244), the TDM H/S/NA and FDM HIS/NA configurations are partly dependent. It should be noted that the TDM HIS/NA configurations can be considered as a subset of the FDM H/S/NA configurations. This means it may be possible to provide an FDM configuration which is equivalent to a TDM configuration (including the provided TDM configuration). In certain slots which are intended for TDM operation, the donor-CU 16*d* can provide equivalent FDM configurations following the TDM configurations. In this way, the IAB-node 16*a* does not need to always check whether or not the donor-CU 16*d* has provided a FDM configuration. One example is depicted in FIG. 21. When FDM mode is activated by the parent IAB-node 16*b*, the IAB-node 16*a* can run FDM until an unconditional fallback to TDM takes place. For slots which are intended for TDM operation, the IAB-node 16*a* can be provided with an equivalent FDM configuration, see Slot 3 in FIG. 21. In an alternate embodiment, the IAB-node 16*a* can also identify a TDM slot if the FDM configurations for all RB-Sets are identical. A further requirement for the identification could be that the FDM configuration corresponds to the TDM configuration.

FIG. 21 is an example diagram showing that, when FDM mode is activated by the parent IAB-node 16*b*, the IAB-node 16*a* can run FDM until an unconditional fallback to TDM takes place. For slots which are intended for TDM operation, the IAB-node 16*a* can be provided with an equivalent FDM configuration.

Other Embodiments

In one embodiment, the TDM H/S/NA and FDM H/S/NA are independent, and separately configured by donor-CU 16*d*, which means the donor-CU 16*d* can configure FDM H/S/NA without taking TDM H/S/NA into consideration. In a related embodiment, the TDM H/S/NA and FDM H/S/NA are separately provided to the IAB-DU.

In one embodiment, when configuring frequency-domain H/S/NA, the donor-CU 16*d* can take time-domain H/S/NA configuration into consideration.

In one embodiment, the same methods can also be extended to a symbol-based granularity, i.e., for a certain symbol either TDM HIS/NA or FDM HIS/NA is applied.

In one embodiment, a new attribute on the resource configuration type (besides the existing two attributes: UL/DL/FL and H/S/NA) in terms of multiplexing mode (e.g., TDM/FDM/SMD, etc.). The new attribute can be provided by the donor-CU 16*d* to the IAB-node 16*a*, together with the TDM/FDM resource configurations. In an alternate embodiment, the new attribute can be provided by the donor-CU 16*d* to the parent IAB-node 16*b*, and thereby the parent IAB-node 16*b* will signal to the IAB-node 16*a* what multiplexing mode (TDM/FDM/SDM, etc.) to use via a Layer-1/Layer-2 signaling.

In one embodiment, the described methods for FDM configurations also apply to SDM configurations. In one embodiment, the determined multiplexing mode can be used to trigger the setup of the corresponding operational conditions, such as timing, power, interference management, etc.

In further embodiments related to (S244), dynamic configuration may affect the determination of multiplexing mode. In particular, this concerns a frequency domain configuration where not both H and NA are configured for the same slot or symbol. For example, a slot or symbol that is configured as FDM [H S], i.e., parts of the spectrum are Hard, whereas the remaining part is Soft, and where the Soft resource is dynamically indicated as Is Available, the slot will in effect be a TDM slot. For this slot or symbol, the timing mode may be determined to be a case timing such as Case-1 timing.

Figure 22:
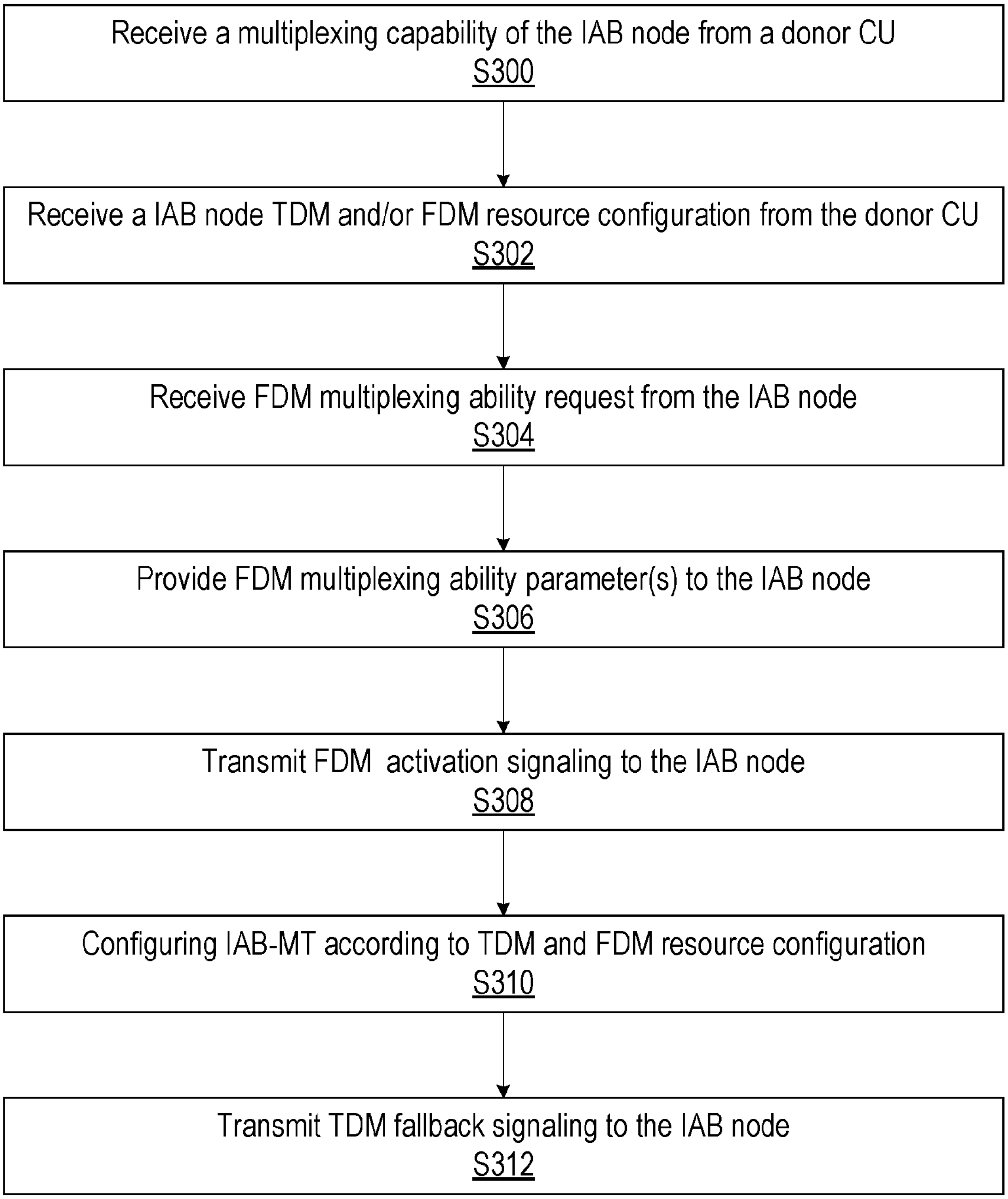
FIG. 22 is another example flow chart of another embodiment of the present disclosure.

FIG. 22 shows an example process performed in another network node 16 (e.g., a first network node 16*a*, a parent node, etc.). The method includes receiving, at step S300, a multiplexing capability of the IAB node (e.g., a second network node 16*b*) from donor CU (e.g., a third network node 16*c*); and/or receiving, at step S302, a IAB node TDM and/or FDM resource configuration (i.e., a resource configuration) from the donor CU (e.g., the third network node 16*c*); and/or receiving, at step S304, an FDM multiplexing ability request from the IAB node (e.g., the second network node 16); and/or providing (i.e., transmitting) FDM multiplexing ability parameter(s) to the IAB node (e.g., the second network node 16*b*); and/or transmitting FDM activation signaling to the IAB node (e.g., the second network node 16*b*); and/or performing (e.g., causing a network node 16 to perform) the configuration of an IAB-MT according to TDM and FDM resource configurations; and/or transmitting TDM fallback signaling to the IAB node (e.g., the second network node 16*b*).

In one or more embodiments, a network node 16 such as an IAB node is configured to receive a first resource configuration associated with a first multiplexing capability and a second resource configuration associated with a second multiplexing capability. At least one of the first and second resource configurations may be for an IAB-DU. In some embodiments, network node 16 may be configured to receive signaling activating one of a first multiplexing mode and a second multiplexing mode. At least one of the first and second multiplexing modes may refer to a resource configuration (e.g., a first resource configuration, a second resource configuration). In some other embodiments, network node 16 is configured to determine whether a fallback condition is fulfilled, where the fallback condition is to fall back to TDM (and/or vice versa). In an embodiment, a resource configuration may indicate one or more attribute types (e.g., UL/DL/FL and/or H/S/NA), where the attribute types may refer to (and/or correspond to) an IAB-DU configuration. In another embodiment, the attribute type may indicate a flexible configuration. The flexible configuration (and/or the configuration) may refer to a transmission direction.

Further, in some embodiments, for a given resource block (RB) set at a symbol, if a frequency domain H/S/NA configuration (e.g., Rel-17 frequency domain H/S/NA configuration) is not provided, another time domain H/S/NA configuration (e.g., the Rel-16 time domain H/S/NA) may be applied, e.g., which may correspond to the features of FIG. 20. In some other embodiments, if both the Rel-16 time domain H/S/NA configuration and Rel-17 frequency domain H/S/NA configuration are provided for a given RB set within a slot, the following may be selected:

Alt. 1: An IAB node applies the frequency domain H/S/NA if (e.g., only if) the IAB node is currently operating in a non-TDM multiplexing mode in the slot, otherwise the Rel-16 time domain H/S/NA configuration is applied.

In an embodiment, if A IAB node (or parent node) may not operate under a given non-TDM multiplexing mode until:

Alt. 1: All required conditions and parameters which have been directly indicated/requested to the parent node (e.g., via MAC-CE) are explicitly acknowledged by the parent node.

Alt. 2: All required conditions and parameters which have been directly indicated/requested to the parent node (e.g., via MAC-CE) are implicitly acknowledged by the parent node or implicitly determined at the child node.

In another embodiment, a support indication of whether FDM is required or not for an enhanced multiplexing operation mode to donor-CU may be used, e.g., in S200.

In some embodiments, whether or not an IAB node can operate under a given non-TDM multiplexing mode is left to (i.e., configured per) an IAB implementation. There may be two aspects at the IAB node: (1) which semi-static configuration to use, e.g., TDM or FDM; and/or (2) will it be TDM or non-TDM operation. With TDM configuration, the IAB node can still perform non-TDM operation, e.g., in soft resource; with FDM configuration, the IAB node can still perform TDM operation, e.g., by using either IAB-DU and/or IAB-MT.

In some other embodiments, if both Rel-16 H/S/NA and Rel-17 H/S/NA are configured for a given resource and the child node is operating in TDM multiplexing mode, one or more of the following alternatives may be considered (e.g., as shown in S230):

- Alt. 1: the child node follows the Rel-16 H/S/NA configuration for the resource;
- Alt. 2: the child node follows the Rel-17 H/S/NA configuration for the resource;
- Alt. 3: A resource configured with Rel-16 H or Rel-16 S with dynamic indication of availability overrides the Rel-17 H/S/NA configuration, otherwise the child node follows the Rel-17 HIS/NA configuration for the resource;
- Alt. 4 the child node follows the Rel-16 or Rel-17 HIS/NA based on implicit indication (e.g., Case 6 timing indication) between parent and child node.

The following is a list of nonlimiting example embodiments:

Embodiment A1. A network node configured to communicate with a wireless device (WD), the network node configured to, and/or comprising a radio interface and/or comprising processing circuitry configured to:

- receive a first resource configuration for a first multiplexing capability and a second resource configuration for a second multiplexing capability;
- receive signaling activating one of the first multiplexing capability and the second multiplexing capability;
- determine whether to use the activated one of the first multiplexing capability and the second multiplexing capability; and
- use one of the first resource configuration and the second resource configuration based on the determination.

Embodiment A2. The network node of Embodiment A1, wherein:

- the network node is an integrated access and backhaul (IAB) node; and
- the first multiplexing capability is one of a time division multiplexing (TDM), frequency division multiplexing (FDM) and space-division multiplexing (SDM) and the second multiplexing capability is another one of the TDM, FDM and SDM; and
- the received first and second resource configurations are based on reported information about a multiplexing capability of the network node.

Embodiment A3. The network node of Embodiment A1, wherein each of the first and second resource configurations indicate at least two attribute types, the first attribute type indicating whether resources are uplink, downlink or flexible and the second attribute type indicating whether resources are hard, soft or not available.

Embodiment B1. A method implemented in a network node, the method comprising:

- receiving a first resource configuration for a first multiplexing capability and a second resource configuration for a second multiplexing capability;
- receiving signaling activating one of the first multiplexing capability and the second multiplexing capability;
- determining whether to use the activated one of the first multiplexing capability and the second multiplexing capability; and
- using one of the first resource configuration and the second resource configuration based on the determination.

Embodiment B2. The method of Embodiment B1, wherein:

- the network node is an integrated access and backhaul (IAB) node; and
- the first multiplexing capability is one of a time division multiplexing (TDM), frequency division multiplexing (FDM) and space-division multiplexing (SDM) and the second multiplexing capability is another one of the TDM, FDM and SDM; and
- the received first and second resource configurations are based on reported information about a multiplexing capability of the network node.

Embodiment B3. The method of Embodiment B1, wherein each of the first and second resource configurations indicate at least two attribute types, the first attribute type indicating whether resources are uplink, downlink or flexible and the second attribute type indicating whether resources are hard, soft or not available.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, the network node comprising:

a radio interface configured to:

receive a first resource configuration associated with a first multiplexing capability and a second resource configuration associated with a second multiplexing capability;

receive signaling activating one of a first multiplexing mode and a second multiplexing mode;

processing circuitry in communication with the radio interface, the processing circuitry configured to:

determine whether to use the activated one of the first multiplexing mode and the second multiplexing mode based at least on one of the first multiplexing mode, the second multiplexing mode, the first resource configuration, the second resource configuration, and a fallback condition; and use one of the first resource configuration and the second resource configuration based on the determination.

2. The network node of claim 1, wherein the radio interface is further configured to:

transmit, to a donor network node, at least one of the first multiplexing capability and the second multiplexing capability; and transmit, to at least one of a parent network node and a child network node, an ability to exploit the at least one of the first multiplexing capability and the second multiplexing capability.

3. The network node of claim 1, wherein the determination of whether to use the activated one of the first multiplexing mode and the second multiplexing mode includes:

determining whether one of the first multiplexing mode and the second multiplexing mode is configured for at least one of a time slot and a symbol.

4. The network node of claim 1, wherein the determination of whether to use the activated one of the first multiplexing mode and the second multiplexing mode includes:

determining whether the first resource configuration and the second resource configuration are equivalent.

5. The network node of claim 1, wherein the determination of whether to use the activated one of the first multiplexing mode and the second multiplexing mode includes:

determining whether the fallback condition is fulfilled, the fallback condition being associated with at least one of a timer expiration, an unsupported multiplexing mode, and operational conditions.

6. The network node of claim 1, wherein the network node is an integrated access and backhaul, IAB, node configured to simultaneously communicate at least with one parent network node and one child network node, the parent network node being a parent IAB node, the child network node being a child IAB node.

7. The network node of claim 1, wherein the first multiplexing capability is one of a time division multiplexing, TDM, a frequency division multiplexing, FDM, and a space-division multiplexing, SDM, and the second multiplexing capability is another one of the TDM, the FDM, and the SDM.

8. The network node of claim 1, wherein the received first and second resource configurations are based on reported information about the first and second multiplexing capabilities of the network node, respectively.

9. The network node of claim 1, wherein each of the first and second resource configurations indicate at least two attribute types, a first attribute type indicates whether resources are associated with at least one of an uplink, a downlink, and a flexible configuration, and a second attribute type indicates whether resources are at least one of hard, soft, and not available.

10. A method performed by a network node, the method comprising:

receiving a first resource configuration associated with a first multiplexing capability and a second resource configuration associated with a second multiplexing capability;

receiving signaling activating one of a first multiplexing mode and a second multiplexing mode;

determining whether to use the activated one of the first multiplexing mode and the second multiplexing mode based at least on one of the first multiplexing mode, the second multiplexing mode, the first resource configuration, the second resource configuration, and a fallback condition; and using one of the first resource configuration and the second resource configuration based on the determination.

11. The method of claim 10, wherein the method further includes:

transmitting, to a donor network node, at least one of the first multiplexing capability and the second multiplexing capability; and transmitting, to at least one of a parent network node and a child network node, an ability to exploit the at least one of the first multiplexing capability and the second multiplexing capability.

12. The method of claim 10, wherein the determination of whether to use the activated one of the first multiplexing mode and the second multiplexing mode includes one or more of:

determining whether one of the first multiplexing mode and the second multiplexing mode is configured for at least one of a time slot and a symbol;

determining whether the first resource configuration and the second resource configuration are equivalent; and determining whether the fallback condition is fulfilled, the fallback condition being associated with at least one of a timer expiration, an unsupported multiplexing mode, and operational conditions.

13. The method of claim 10, wherein the first multiplexing capability is one of a time division multiplexing, TDM, a frequency division multiplexing, FDM, and a space-division multiplexing, SDM, and the second multiplexing capability is another one of the TDM, the FDM, and the SDM.

14. The method of claim 10, wherein the received first and second resource configurations are based on reported information about the first and second multiplexing capabilities of the network node, respectively.

15. The method of claim 10, wherein each of the first and second resource configurations indicate at least two attribute types, a first attribute type indicates whether resources are associated with at least one of an uplink, a downlink, and a flexible configuration, and a second attribute type indicates whether resources are at least one of hard, soft, and not available.

16. A parent network node, the parent network node comprising:

a radio interface configured to:

receive, from a network node, an ability to exploit at least one of a first multiplexing capability and a second multiplexing capability;

transmit, to the network node, a first resource configuration associated with the first multiplexing capability and the second resource configuration associated with the second multiplexing capability;

transmit, to the network node, signaling activating one of a first multiplexing mode and a second multiplexing mode, the network node being configured to determine whether to use the activated one of the first multiplexing mode and the second multiplexing mode, and to use one of the first resource configuration and the second resource configuration based on the determination, and processing circuitry in communication with the radio interface, the processing circuitry configured to:

determine the activation of one of the first multiplexing mode and the second multiplexing mode based at least in part on the received ability and operational conditions.

17. The parent network node of claim 16, wherein the radio interface is further configured to:

receive, from a donor network node, at least one of the first multiplexing capability and the second multiplexing capability of the network node.

18. The parent network node of claim 16, wherein each of first and second resource configurations associated with the first and second multiplexing capabilities, respectively, indicates at least two attribute types, a first attribute type indicates whether resources are associated with at least one of an uplink, a downlink, and a flexible configuration, and a second attribute type indicates whether resources are at least one of hard, soft, and not available.

19. The parent network node of claim 16, wherein the operational conditions include at least one of a timing, a power control, and a cross-link interference.

20. The parent network node of claim 16, wherein the ability is associated with at least one of a time division multiplexing, TDM, a frequency division multiplexing, FDM, and a space-division multiplexing, SDM.

21. The parent network node of claim 16, wherein the ability is associated with at least one of a mobile termination and a distributed unit and at least one of a transmission and a reception of signaling.

22. The parent network node of claim 16, wherein the parent network node is a parent integrated access and backhaul, IAB, node, and the network node is an IAB node configured to simultaneously communicate at least with the parent network node and one child network node, the child network node being a child IAB node.

23. A method performed by a parent network node, the method comprising:

receiving, from a network node, an ability to exploit at least one of a first multiplexing capability and a second multiplexing capability;

transmitting, to the network node, a first resource configuration associated with the first multiplexing capability and the second resource configuration associated with the second multiplexing capability;

determining an activation of one of a first multiplexing mode and a second multiplexing mode based at least in part on the received ability and operational conditions; and transmitting, to the network node, signaling activating one of the first multiplexing mode and the second multiplexing mode according to the determination, the network node being configured to determine whether to use the activated one of the first multiplexing mode and the second multiplexing mode, and to use one of the first resource configuration and the second resource configuration based on the determination.

24. The method of claim 23, wherein the method further includes:

receiving, from a donor network node, at least one of the first multiplexing capability and the second multiplexing capability of the network node.

25. The method of claim 23, wherein each of first and second resource configurations associated with the first and second multiplexing capabilities, respectively, indicates at least two attribute types, a first attribute type indicates whether resources are associated with at least one of an uplink, a downlink, and a flexible configuration, and a second attribute type indicates whether resources are at least one of hard, soft, and not available.

26. The method of claim 23, wherein the operational conditions include at least one of a timing, a power control, and a cross-link interference.

27. The method of claim 23, wherein the ability is associated with one or both of:

at least one of a time division multiplexing, TDM, a frequency division multiplexing, FDM, and a space-division multiplexing, SDM; and least one of a mobile termination and a distributed unit and at least one of a transmission and a reception of signaling.

* * * * *